(12) United States Patent
Makiguchi et al.

(10) Patent No.: US 10,338,462 B2
(45) Date of Patent: Jul. 2, 2019

(54) AERIAL IMAGE DISPLAY DEVICE

(71) Applicant: NIPPON TELEGRAPH AND TELEPHONE CORPORATION, Tokyo (JP)

(72) Inventors: Motohiro Makiguchi, Yokosuka (JP); Arinobu Niijima, Yokosuka (JP); Narimune Matsumura, Yokosuka (JP); Kota Hidaka, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/755,387

(22) PCT Filed: Aug. 31, 2016

(86) PCT No.: PCT/JP2016/003970
§ 371 (c)(1),
(2) Date: Feb. 26, 2018

(87) PCT Pub. No.: WO2017/038091
PCT Pub. Date: Mar. 9, 2017

(65) Prior Publication Data
US 2018/0246337 A1    Aug. 30, 2018

(30) Foreign Application Priority Data

Aug. 31, 2015   (JP) .................................. 2015-171121
Feb. 22, 2016   (JP) .................................. 2016-031344
Mar. 25, 2016   (JP) .................................. 2016-062537

(51) Int. Cl.
*G03B 21/60* (2014.01)
*G03B 21/606* (2014.01)
(Continued)

(52) U.S. Cl.
CPC ............. *G03B 21/606* (2013.01); *G02B 5/12* (2013.01); *G02B 27/0101* (2013.01);
(Continued)

(58) Field of Classification Search
CPC  G02B 27/2292; G02B 27/22; G02B 27/2235; G02B 5/12; G02B 27/283;
(Continued)

(56) References Cited

U.S. PATENT DOCUMENTS 4,509,837 A * 4/1985 Kassies .............. G02B 27/2292
353/10
4,671,625 A * 6/1987 Noble ................. G02B 27/2292
359/478
(Continued)

FOREIGN PATENT DOCUMENTS

JP    H06-235885    8/1994
JP    H06-342130 A    12/1994
(Continued)

OTHER PUBLICATIONS

Palm Top Theater, http://www.palmtoptheater.com/ja/device.html, accessed Jun. 8, 2015.
(Continued)

*Primary Examiner* — Sultan Chowdhury
*Assistant Examiner* — Magda Cruz
(74) *Attorney, Agent, or Firm* — Workman Nydegger

(57) ABSTRACT

An aerial image display device is capable of changing a depth of a virtual image viewed by an observer without changing a distance between at least one display device and an optical element forming the virtual image. The aerial image display device includes a display device, optical elements, and a reflecting member. The optical elements are installed corresponding to different display regions of a display surface of the display device and sequentially
(Continued)

arranged along the display surface in an observation direction of an observer. The optical element is installed obliquely with an angle of about 45° in a −X direction when viewed from the display surface of the display device. The optical element is installed obliquely with an angle of about 45° in an X direction when viewed from the display surface of the display device.

15 Claims, 25 Drawing Sheets

(51) Int. Cl.
G02B 27/01 (2006.01)
G02B 27/26 (2006.01)
G02B 27/22 (2018.01)
G02B 27/28 (2006.01)
G02B 5/12 (2006.01)
H04N 13/30 (2018.01)

(52) U.S. Cl.
CPC ......... *G02B 27/22* (2013.01); *G02B 27/2221* (2013.01); *G02B 27/2235* (2013.01); *G02B 27/2292* (2013.01); *G02B 27/26* (2013.01); *G02B 27/283* (2013.01); *G02B 27/286* (2013.01); *H04N 13/30* (2018.05)

(58) Field of Classification Search
CPC .. G02B 27/26; G02B 27/286; G02B 27/0101; G02B 2027/0123; G02B 27/2221; H04N 13/30; G03B 21/606
See application file for complete search history.

(56) References Cited

U.S. PATENT DOCUMENTS

| 5,726,806 | A | * | 3/1998 | Holden | G02B 27/01 |
| | | | | | 359/630 |
| 5,782,547 | A | * | 7/1998 | Machtig | G02B 27/2292 |
| | | | | | 353/28 |
| 6,147,805 | A | * | 11/2000 | Fergason | G02B 27/0172 |
| | | | | | 359/630 |
| 6,262,841 | B1 | | 7/2001 | Dike | |
| 6,808,268 | B2 | * | 10/2004 | Vrachan | G03B 21/006 |
| | | | | | 353/10 |
| 7,719,770 | B2 | * | 5/2010 | Jang | H04N 13/346 |
| | | | | | 359/633 |
| 2002/0101657 | A1 | | 8/2002 | Min et al. | |
| 2002/0126396 | A1 | * | 9/2002 | Dolgoff | G02B 27/2278 |
| | | | | | 359/743 |
| 2005/0111101 | A1 | * | 5/2005 | Dike | G02B 27/0101 |
| | | | | | 359/489.07 |
| 2014/0177063 | A1 | | 6/2014 | Wang et al. | |
| 2017/0261759 | A1 | | 9/2017 | Yamamoto | |

FOREIGN PATENT DOCUMENTS

| JP | 2003066371 | | 5/2003 |
| JP | 2003-307702 | A | 10/2003 |
| JP | 2004-13051 | A | 1/2004 |
| JP | 2006135378 | | 5/2006 |
| JP | 2006-317708 | A | 11/2006 |
| JP | 2007-517241 | A | 6/2007 |
| JP | 2008020564 | | 1/2008 |
| JP | 49-12773 | A | 1/2012 |
| JP | 49-43567 | A | 3/2012 |
| WO | 2005/052651 | A2 | 6/2005 |
| WO | 2016/088683 | A1 | 6/2016 |

OTHER PUBLICATIONS

Shiro Suyama et al., *Apparent 3-D Image Using Luminance-Modulated Two 2-D Images Displayed at Different Depths*, Advanced Image Seminar 2001, The Institute of Image Electronics Engineers of Japan, Apr. 20, 2001, pp. 39-46.

International Search Report dated Nov. 15, 2016, issued in PCT Application No. PCT/JP2016/003970, filed Aug. 31, 2016.

International Preliminary Report on Patentability dated Mar. 15, 2018, issued in PCT Application No. PCT/JP2016/003970, filed Aug. 31, 2016.

Notice of allowance received in Japanese Application No. JP2017-508130, dated Oct. 17, 2017.

Office Action dated Apr. 9, 2019 in corresponding European Patent Application No. 16841125.4.

Office Action dated Jan. 8, 2019 in corresponding Japanese Patent Application No. 2017-069079.

* cited by examiner

AERIAL IMAGE DISPLAY DEVICE

TECHNICAL FIELD

The present invention relates to an aerial image display device that displays an aerial image.

BACKGROUND ART

An aerial image display device that reflects light emitted from a display surface of a display device such as a smartphone or a tablet terminal through an optical element such as a half mirror or a transparent plate installed obliquely to the display surface and projects a virtual image of a display image displayed on the display surface onto a space is known (for example, see Non-Patent Literature 1). Among such aerial image display devices, there is a multifaceted projection type aerial image display device that an aerial image with a stereoscopic effect by causing a plurality of virtual images formed by a plurality of optical elements to be superimposedly displayed back and forth when viewed from an observer.

CITATION LIST

Non Patent Literature

Non-Patent Literature 1: "Palm Top Theater," [online], [accessed Jun. 8, 2015], Internet <URL:http://www.palmtoptheater.com/ja/device.html>

Non-Patent Literature 2: Shiro Suyama et al., "3-D display method based on new depth perceptual phenomenon," Advanced Image Seminar 2001, The Institute of Image Electronics Engineers of Japan, Apr. 20, 2001, pp. 39 to 46

SUMMARY OF INVENTION

Technical Problem

FIG. 22 is a side view illustrating a configuration example of a multifaceted projection type aerial image display device 10. The aerial image display device 10 illustrated in FIG. 22 displays an aerial image by causing virtual images of a plurality of the display images individually displayed in different display regions of a display surface of a display device 11 to be superimposedly displayed back and forth when viewed from an observer 1 observing in a direction substantially horizontal to the display surface.

In the aerial image display device 10 illustrated in FIG. 22, the display device 11 is installed on one side of a housing 10a of the aerial image display device 10 (a top surface of the housing 10a in FIG. 22) such that the display surface faces the housing 10a side (the display surface faces downward in FIG. 22). An opening is formed in a region corresponding to the display surface of the display device 11 in an installation surface of the display device 11 of the housing 10a so that light emitted from the display surface is incident on the inside of the housing 10a. The opening may be blocked or covered with a transparent member. Hereinafter, a direction from a surface of the housing 10a on the observer 1 side to a surface opposite to the surface of the housing 10a on the observer 1 side (an observation direction of the observer 1) is referred to as an "X direction."

The aerial image display device 10 illustrated in FIG. 22 includes optical elements 12 and 13.

The optical elements 12 and 13 are installed along the display surface of the display device 11 obliquely with an angle of about 45° with respect to a −X direction when viewed from the display surface and sequentially arranged along the observation direction of the observer 1. In FIG. 22, when viewed from the observer 1 side, the optical element 13 is installed on the front side, and the optical element 12 is installed on the back side.

The optical element 12 reflects emitted light emitted from a display region of the display surface corresponding to the optical element 12 in a direction (the −X direction) toward the observer 1. The optical element 13 reflects emitted light from a display region of the display surface corresponding to the optical element 13 in the direction (the −X direction) toward the observer 1. Further, the optical element 13 transmits the light reflected by the optical element 12 in the direction toward the observer 1. Specific examples of the optical elements 12 and 13 include a half mirror in which a ratio of reflection and transmission can be arbitrarily designed (hereinafter referred to as a "half mirror") and a transparent plate in which reflectance is not 0 (hereinafter referred to as a "transparent plate").

As the light incident from the corresponding display region is reflected by the optical element 12, a virtual image B1 of a display image A1 displayed in the display region corresponding to the optical element 12 is formed at a position of a back side end portion of the optical element 12 when viewed from the observer 1. Further, as the light incident from the corresponding display region is reflected by the optical element 13, a virtual image B2 of a display image A2 displayed in the display region corresponding to the optical element 13 is formed at a position of a back side end portion of the optical element 13 when viewed from the observer 1.

As described above, the optical elements 12 and 13 are sequentially arranged in the observation direction of the observer 1. Further, the optical element 13 transmits the light reflected by the optical element 12. Therefore, the virtual image B1 and the virtual image B2 are superimposedly displayed back and forth as viewed from the observer 1, and the observer 1 can view an aerial image with a stereoscopic effect.

In a case in which the virtual image B1 and the virtual image B2 are superimposedly displayed back and forth as illustrated in FIG. 22, it is possible to display an aerial image with a more stereoscopic effect by reducing a distance diff between the virtual image B1 and the virtual image B2. However, in the aerial image display device 10, there is a problem in that the distance diff between the virtual image B1 and the virtual image B2 is unable to be reduced to be equal to or less than a height H of the virtual image B1. Hereinafter, this problem will be described with reference to FIG. 23.

In order to reduce the distance diff between the virtual image B1 and the virtual image B2, it is necessary to reduce a distance between the optical element 12 and the optical element 13 as illustrated in FIG. 23. The distance diff between the virtual image B1 and the virtual image B2 can be reduced by reducing the distance between the optical element 12 and the optical element 13. However, if the distance between the optical element 12 and the optical element 13 is reduced to be equal to or less than the height H of the virtual image B1, as illustrated in FIG. 23, a part of the display region of the display image A1 overlaps the optical element 13, and a virtual image B1' of a part of the display image A1 is formed by the optical element 13. As a result, the aerial image is unable to be properly displayed.

Therefore, in the aerial image display device 10, the distance diff between the virtual image B1 and the virtual image B2 is unable to be reduced to be equal to or less than the height H of the virtual image B1, and it is difficult to display an aerial image with a more stereoscopic effect.

It is possible to form the virtual image B1 on the back side as viewed from the observer by increasing the distance between the display device 11 and the optical element 13, but at this time, the distance between the display device 11 and the optical element 12 is also increased, and the virtual image B2 is also formed on the back side as seen from the observer. If the display device 11 is installed obliquely to the X direction, the optical element 13 can be separated from the display device 11 farther than the optical element 12, but the virtual image is displayed obliquely in the X direction or the −X direction.

The present invention was made to solve the above problem, and it is an object of the present invention to provide an aerial image display device which is capable of changing the depth of the virtual image viewed from the observer without changing the distance between at least one display device and the optical element forming the virtual image.

Solution to Problem

In order to solve the above problem, an aerial image display device according to the present invention includes a display device, a first optical element on which light emitted from the display device is incident, the first optical element transmitting part of incident light and reflecting part of the incident light, and a second optical element on which the light emitted from the display device is incident, the second optical element reflecting the light which is emitted from the display device and passes through the first optical element toward a reflecting surface of the first optical element, in which the light which is emitted from the display device, reflected by the second optical element, and reflected by the reflecting surface of the first optical element forms a first virtual image corresponding to a first display image displayed on the display device.

In another aspect of the present invention, the aerial image display device further includes a third optical element on which the light emitted from the display device is incident, the third optical element reflecting the light emitted from the display device toward a transmitting surface of the first optical element, in which the light which is emitted from the display device and reflected by the third optical element forms a second virtual image corresponding to a second display image displayed on the display device, and the second optical element is installed so that an optical path length until the light emitted from the display device is reflected is larger than an optical path length until the third optical element reflects the light emitted from the display device.

In another aspect of the present invention, the aerial image display device further includes one or more fourth optical elements on which the light emitted from the display device is incident, the one or more fourth optical elements being arranged between the first optical element and the third optical element, transmitting part of the incident light, and reflecting part of the incidence light and one or more fifth optical elements on which the light emitted from the display device is incident, the one or more fifth optical elements reflecting the light which is emitted from the display device and passes through the one or more fourth optical elements toward reflecting surfaces of the one or more fourth optical elements, in which the light which is emitted from the display device, reflected by the one or more fifth optical elements, and reflected toward the transmitting surface of the first optical element by the reflecting surfaces of the one or more fourth optical elements forms one or more third virtual images corresponding to one or more third display images displayed on the display device, and the second optical element and the one or more fifth optical elements are installed so that the first optical element, the one or more fourth optical elements, and the third optical element are in a descending order of optical path lengths until the light emitted from the display device is reflected.

In another aspect of the present invention, the first and second display images and the one or more third display images are in a descending order of sizes in accordance with an arrangement order of a corresponding optical element from the first display image.

In another aspect of the present invention, the first optical element, the one or more fourth optical elements, the third optical element are in a descending order of heights of positions of upper ends thereof in accordance with an arrangement order from the first optical element.

In another aspect of the present invention, the third optical element has higher reflectance than the first optical element and the one or more fourth optical elements, and the second optical element is installed so that when an observer views the first and second virtual images from the first optical element side, the first virtual image is formed on the back side further than the second virtual image.

In another aspect of the present invention, the second optical element includes a plurality of optical elements, and reflects the light passing through the first optical element multiple times through the plurality of optical elements and emits the reflected light to the first optical element.

In another aspect of the present invention, an angle formed by the first optical element and the second optical element is about 45°, and an angle formed by the first optical element and the display surface of the display device is greater than 0° and less than 90°.

In another aspect of the present invention, the second optical element is installed substantially parallel to the display surface of the display device, an angle formed by the second optical element and the first optical element deviates from 45° by a predetermined angle, and an angle formed by the first optical element and the display surface is greater than 0° and less than 90°, and the display image of the display surface is corrected in accordance with the predetermined angle.

In another aspect of the present invention, the display device includes a first display device and a second display device installed to face the first display device with the first and second optical elements interposed therebetween, the second optical element includes a reflecting surface that reflects the light which is emitted from the first display device and passes through the first optical element toward the reflecting surface of the first optical element and a transmitting surface that transmits the light emitted from the second display device and faces the reflecting surface of the second optical element, the light emitted from the first display device passes through the transmitting surface of the first optical element and is incident on the reflecting surface of the second optical element, the light emitted from the second display device passes through the transmitting surface of the second optical element and is incident on the reflecting surface of the first optical element, and the light which is emitted from the first display device, reflected by the second optical element, and reflected by the reflecting surface of the first optical element forms a second virtual image corresponding to a second display image displayed on the first display device, and the light which is emitted from the second display device, passes through the second optical element, and is reflected by the reflecting surface of the first optical element forms a third virtual image corresponding to a third display image displayed on the second display device.

In another aspect of the present invention, the first display device, the second display device, and the second optical element are installed substantially parallel to one another, and the first optical element is arranged to form an angle of about 45° with the second optical element.

In another aspect of the present invention, the aerial image display device further includes a third optical element on which the light emitted from the first display device is incident, the third optical element reflecting the light emitted from the first display device toward the transmitting surface of the first optical element, in which the light which is emitted from the first display device and reflected by the third optical element forms a fourth virtual image corresponding to a fourth display image displayed on the first display device.

In another aspect of the present invention, the aerial image display device further includes one or more fourth optical elements on which the light emitted from the first and second display devices is incident, the one or more fourth optical elements being arranged between the first optical element and the third optical element, transmitting part of the incident light from the first display device, and reflecting part of the incidence light and one or more fifth optical elements on which the light emitted from the first and second display devices is incident, each of the one or more fifth optical elements including a reflecting surface that reflects the light which is emitted from the first display device and passes through the one or more fourth optical elements toward the reflecting surfaces of the one or more fourth optical elements and a transmitting surface that transmits the light emitted from the second display device and faces the reflecting surfaces of the one or more fifth optical elements, in which the light which is emitted from the first display device, reflected by the one or more fifth optical elements, and reflected by the reflecting surfaces of the one or more fourth optical elements forms one or more fifth virtual images corresponding to one or more fifth display images displayed on the first display device, and the light which is emitted from the second display device, passes through the one or more fifth optical elements, and reflected on the reflecting surfaces of the one or more fourth optical elements forms one or more sixth virtual images corresponding to one or more sixth display images displayed on the second display device.

In another aspect of the present invention, a region in which the second to fourth virtual images, the one or more fifth virtual images, and the one or more sixth virtual images are formed is illuminated by the first display device.

In another aspect of the present invention, the aerial image display device further includes a first lens that forms a first portion of the first virtual image and a second lens that forms a second portion of the first virtual image.

Advantageous Effects of Invention

According to the aerial image display device of the present invention, it is possible to change the depth of the virtual image viewed from the observer without changing the distance between at least one display device and the optical element forming the virtual image. By using this, it is possible to display an aerial image with a stereoscopic effect. Further, a degree of freedom of design is high, it is possible to cause a real object and a virtual image to be superimposed on each other, and no concealment occurs.

DESCRIPTION OF EMBODIMENTS

Hereinafter, embodiments of the present invention will be described.

First Embodiment

Figure 1:
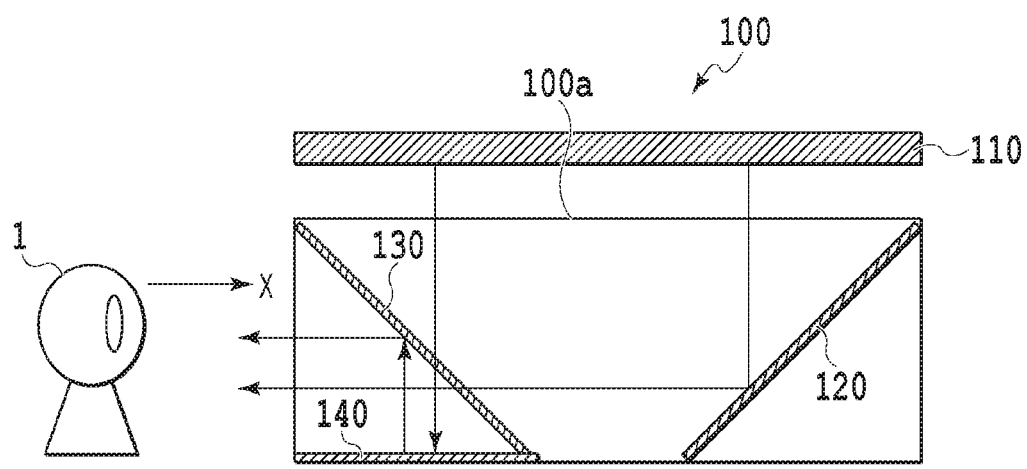
FIG. 1 is a diagram illustrating a configuration example of an aerial image display device according to a first embodiment of the present invention.

FIG. 1 is a side view illustrating a configuration example of an aerial image display device 100 according to a first embodiment of the present invention. The aerial image display device 100 illustrated in FIG. 1 displays an aerial image by causing virtual images of a plurality of display images individually displayed in different display regions of a display surface of a display device 110 to be superimposedly displayed back and forth for the observer 1 observing in a direction substantially horizontal to the display surface.

In the aerial image display device 100 illustrated in FIG. 1, the display device 110 is installed on one side of a housing 100a of the aerial image display device 100 (a top surface of the housing 100a in FIG. 1) such that the display surface faces the housing 100a side (the display surface faces downward in FIG. 1). An opening is formed in a region corresponding to the display surface of the display device 110 in an installation surface of the display device 110 of the housing 100a so that light emitted from the display surface is incident on the inside of the housing 100a. The opening may be blocked or covered with a transparent member. The display device 110 is, for example, a smartphone, a tablet terminal, or the like but not limited thereto, and the display device 110 may be a display device having a display surface of a larger size. Further, the display device 110 may be formed integrally with the aerial image display device 100. In FIG. 1, for the sake of convenience, the display device 110 and the top surface of the housing 100a are illustrated to be disposed with a predetermined gap therebetween, but practically, the display device 110 and the top surface of the housing 100a are substantially in close contact with each other. Hereinafter, a direction from a surface of the housing 100a on the observer 1 side to a surface opposite to the surface of the housing 100a on the observer 1 side (an observation direction of the observer 1) is referred to as an "X direction." Hereinafter, a direction in which the display surface of the display device 110 faces is referred to as a "Y direction."

The aerial image display device 100 illustrated in FIG. 1 includes optical elements 120 and 130 and a reflecting member 140. Here, the optical elements 120 and 130 and the reflecting member 140 are distinguished using different terms for the sake of convenience of description, but the reflecting member 140 is also generally the same optical element as the optical elements 120 and 130. It should be noted that the optical elements 120 and 130 and the reflecting member 140 are distinguished in accordance with only a difference in purpose of use in the present invention.

The optical elements 120 and 130 are installed corresponding to different display regions of the display surface of the display device 110 and sequentially arranged along the display surface in the observation direction of the observer 1. In FIG. 1, when viewed from the observer 1, the optical element 130 is installed on the front side, and the optical element 120 is installed on the back side.

The optical element 120 is installed obliquely with an angle of about 45° with respect to the −X direction when viewed from the display surface of the display device 110 and reflects emitted light from the display region of the display surface corresponding to the optical element 120 in a direction toward the observer 1.

Figure 2:
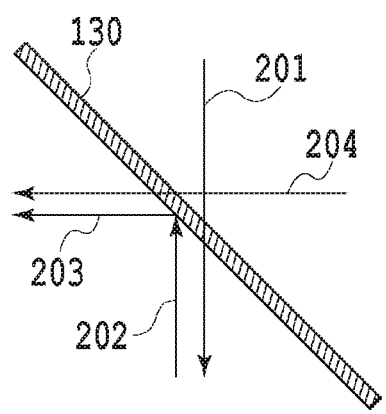
FIG. 2 is a diagram illustrating transmission and reflection of light performed by an optical element 130.

The optical element 130 is installed obliquely with an angle of about 45° with respect to the X direction when viewed from the display surface of the display device 110. Therefore, the optical element 120 and the optical element 130 are inclined in opposite directions. The optical element 130 transmits emitted light (light 201 illustrated in FIG. 2) from the display region of the display surface corresponding to the optical element 130, reflects light (light 202 illustrated in FIG. 2) obtained when transmitted light is reflected by the reflecting member 140, and causes light (light 203 illustrated in FIG. 2) to be emitted in the direction toward the observer 1. Further, the optical element 130 transmits light (light 204 illustrated in FIG. 2) which is emitted from the optical element 120 toward the observer 1. Specific examples of the optical elements 120 and 130 include a half mirror and a transparent plate.

The reflecting member 140 corresponds to the optical element 130, is installed substantially parallel to the display surface of the display device 110, and installed to interpose the optical element 130 together with the display region corresponding to the optical element 130. In other words, the display region corresponding to the optical element 130, the optical element 130, and the reflecting member 140 are installed on a substantially straight line. Therefore, the light which is emitted from the display region corresponding to the optical element 130 and then passes through the optical element 130 is incident on the reflecting member 140. The reflecting member 140 reflects the incident light toward the optical element 130. As a specific example of the reflecting member 140, a full mirror that totally reflect incident light, or the like is mentioned.

Figure 3:
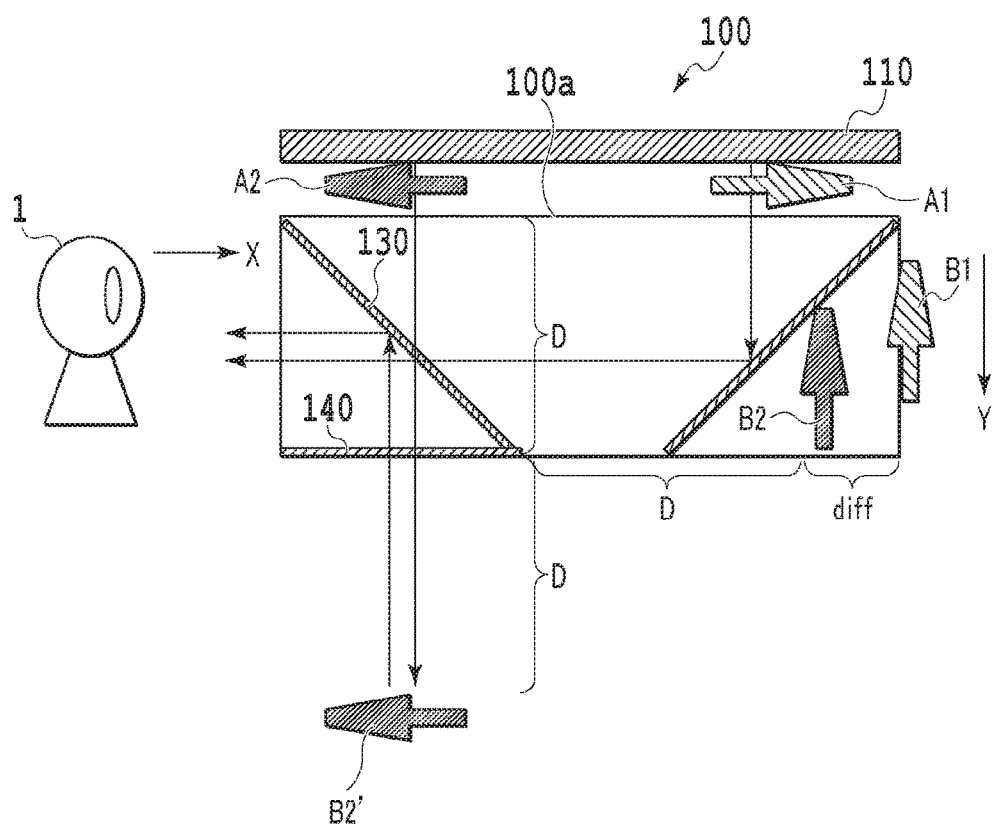
FIG. 3 is a diagram for describing display of an aerial image performed by the aerial image display device illustrated in FIG. 1.

FIG. 3 is a diagram for describing display of an aerial image performed by the aerial image display device 100. Hereinafter, a thickness of the optical elements 120 and 130 in the Y direction is indicated by D.

The emitted light from the display region corresponding to the optical element 120 is reflected toward the observer 1 by the optical element 120, and thus a virtual image B1 of a display image A1 displayed in the display region corresponding to the optical element 120 is formed at a position of a back side end portion of the optical element 120 when viewed from the observer 1. As described above, the optical element 120 directly reflects the incident light from the corresponding display region, so that the virtual image B1 is formed.

Further, the emitted light from the display region corresponding to the optical element 130 passes through the optical element 130 and is incident on the reflecting member 140, and thus a virtual image B2' of a display image A2 displayed in the display region corresponding to the optical element 130 is formed at a position away from the reflecting member 140 by D in the Y direction. Further, the light which passes through the optical element 130 and is reflected by the reflecting member 140 toward the optical element 130 is reflected toward the observer 1 by the optical element 130, and thus a virtual image B2 of the virtual image B2' is formed at a back side position away from the back side end portion of the optical element 130 by D in the X direction when viewed from the observer 1. As described above, the optical element 130 indirectly reflects the emitted light from the corresponding display region (after the emitted light from the corresponding display region is reflected by the reflecting member 140), and thus the virtual image B2 is formed.

As described above, the optical elements 120 and 130 are sequentially arranged in the observation direction of the observer 1. Further, the optical element 130 transmits the light reflected by the optical element 120. Therefore, the virtual image B1 and the virtual image B2 are superimposedly displayed back and forth when viewed from the observer 1, and the observer 1 can visually recognize an aerial image with a stereoscopic effect.

Here, in the aerial image display device 100 illustrated in FIG. 1, it is possible to form the virtual image B2 at the back side position away from the back side end portion of the optical element 130 by D in the X direction when viewed from the observer 1. Therefore, it is possible to display an aerial image with a more stereoscopic effect in which the distance between the virtual image B1 and the virtual image B2 is smaller than the height of the virtual image by adjusting the distance between the optical element 120 and the optical element 130. Further, as can be seen from FIG. 3, although the distance between the optical element 120 and the optical element 130 is reduced (although the front side end portion of the optical element 120 and the back side end portion of the optical element 130 come into contact with each other when viewed from the observer 1), since the display regions corresponding one optical element and the other optical element do not overlap, the virtual image B1 and the virtual image B2 do not interfere.

Since the virtual image B1 is formed such that the emitted light from the display region is reflected once by the optical element 120, the display image A1 is an image obtained by inverting an actual display target image left and right. Further, since the virtual image B2 is formed such that the emitted light from display region is reflected twice by the reflecting member 140 and the optical element 130, the display image A2 is an image obtained by inverting an actual display target image upside down.

Figure 4:
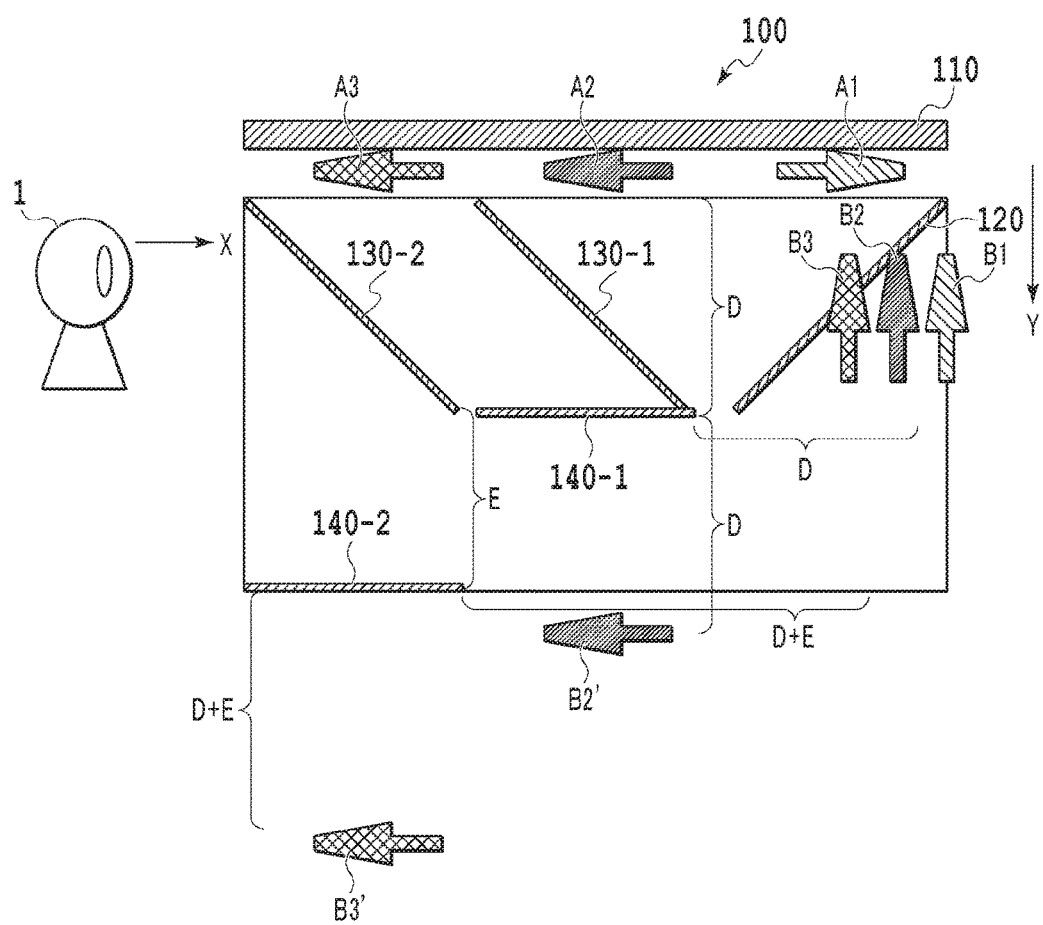
FIG. 4 is a diagram illustrating another configuration example of the aerial image display device according to the first embodiment of the present invention.

In the above description, the number of optical elements 130 is one, but the number of optical elements 130 may be two or more. FIG. 4 is a side view illustrating a configuration example of an aerial image display device 100 including a plurality of optical elements 130.

The aerial image display device 100 illustrated in FIG. 4 includes a plurality of optical elements 130 (optical elements 130-1 and 130-2) and reflecting members 140 (140-1 and 140-2) corresponding to the respective optical elements 130.

The optical elements 130-1 and 130-2 are sequentially arranged along the observation direction of the observer 1. In FIG. 4, when viewed from the observer 1, the optical element 130-2 is installed on the front side, and an optical element 130-1 is installed on the back side.

The reflecting member 140-1 corresponds to the optical element 130-1 and is installed at a position away from a top surface of a housing 101a (the display surface of the display device 110) by D in the Y direction. The reflecting member 140-2 corresponds to the optical element 130-2 and is installed at a position away from the back side end portion of the optical element 130-2 in the X direction by E in the Y direction.

The optical element 130-1 transmits the emitted light from the corresponding display region and reflects reflected light obtained by reflecting the transmitted light by the reflecting member 140-1 toward the observer 1. Further, the optical element 130-1 transmits the light reflected toward the observer 1 by the optical element 120.

The optical element 130-2 transmits the emitted light from the corresponding display region and reflects reflected light obtained by reflecting the transmitted light by the reflecting member 140-2 toward the observer 1. Further, the optical element 130-2 transmits the light reflected toward the observer 1 by the optical element 120 and the optical element 130-1.

If the optical element 130-1 is compared with the optical element 130-2, the optical element 130-2 is larger in an optical path length until the incident light which is emitted from the corresponding display region and then incident on each optical element is reflected toward the observer 1. Further, if the optical element 130-1 is compared with the optical element 120, the optical element 130-1 is larger in an optical path length until the incident light from the corresponding display region is reflected toward the observer 1 (substantially zero in the case of the optical element 120). As described above, in the aerial image display device 100 illustrated in FIG. 4, the reflecting members 140 corresponding to the respective optical elements 130 are installed such that the optical element on the front side when viewed from the observer 1 is larger in the optical path length until the incident light from the corresponding display region is reflected toward the observer 1. Further, also in the aerial image display device 100 illustrated in FIG. 1, the reflecting members 140 corresponding to the respective optical elements 130 are installed such that the optical element on the front side when viewed from the observer 1, that is, the optical element 130 is larger in the optical path length until the incident light from the corresponding display region is reflected toward the observer 1 than the optical element 120 on the back side.

As the emitted light from the display region corresponding to the optical element 120 is reflected toward the observer 1 by the optical element 120, the virtual image B1 of the display image A1 displayed in the display region corresponding to the optical element 120 is formed at the position of the back side end portion of the optical element 120 when viewed from the observer 1.

Further, as the emitted light from the display region corresponding to the optical element 130-1 passes through the optical element 130-1 and is incident on the reflecting member 140-1, the virtual image B2' of the display image A2 displayed in the display region corresponding to the optical element 130-1 is formed at a position away from the reflecting member 140-1 by D in the Y direction. Further, as the light reflected toward the optical element 130-1 by the reflecting member 140-1 is reflected toward the observer 1 by the optical element 130-1, the virtual image B2 of the virtual image B2' is formed at a back side position away from the back side end portion of the optical element 130-1 by D when viewed from the observer 1. Similarly, a virtual image B3' of a display image A3 displayed in the display region corresponding to the optical element 130-2 is formed at a position away from the reflecting member 140-2 by D+E in the Y direction. Further, a virtual image B3 of the virtual image B3' is formed at a back side position away from the back side end portion of the optical element 130-2 by D+E when viewed from the observer 1.

The optical element 130-1 transmits the light reflected toward the observer 1 by the optical element 120. Further, the optical element 130-2 transmits the light reflected toward the observer 1 by the optical element 120 and the optical element 130-1. Therefore, the virtual image B1, the virtual image B2, and the virtual image B3 are superimposedly displayed back and forth when viewed from the observer 1. As described above, in the aerial image display device 100 illustrated in FIG. 4, an aerial image can be displayed such that an arbitrary number of the virtual images are superimposed. Further, in the aerial image display device 100 illustrated in FIG. 4, the corresponding reflecting member 140 is installed such that the optical element 130 on the front side when viewed from the observer 1 is larger in the optical path length until the incident light from the corresponding display region is reflected in a predetermined direction. Therefore, since the virtual image performed by the optical element 130 on the front side when viewed from the observer 1 is greatly shifted to and formed at the back side position in the X direction, the distance between the virtual images is reduced, and the aerial image with the more stereoscopic effect can be displayed.

In the aerial image display device 100 illustrated in FIG. 4, it is possible to display the aerial image with the more stereoscopic effect in which the distance between the virtual image B2 and the virtual image B3 is small by adjusting the distance E or the like between the optical element 130-2 and the reflecting member 140-2. Therefore, in the aerial image display device 100 illustrated in FIG. 4, the optical element 120 is not essential, and it is possible to increase the aerial image by installing a plurality of optical elements 120.

In short, in the present invention, the reflecting member 140 is preferably installed such that the optical path length until the corresponding optical element 130 reflects the incident light from the corresponding display region is larger than the optical path length (substantially zero in the case of the optical element 120) until the optical element (it does not matter whether it is the optical element 120 or the optical element 130) installed on the back side further than the corresponding optical element 130 when viewed from the observer 1 reflects the incident light from the corresponding display region. With this configuration, since the virtual image formed by the optical element 130 is close to the virtual image formed by another optical element installed on the back side further than the optical element 130 when viewed from the observer 1, it is possible to reduce the distance between the two virtual images and display the aerial image with the more stereoscopic effect.

Thus, according to the present embodiment, the aerial image display device 100 includes a plurality of optical elements which correspond to different display regions of the display surface of the display device 110 and form the virtual images of the display images of the corresponding display regions by reflecting the incident light from the corresponding display regions, the plurality of optical elements are sequentially arranged along the observation direction of the observer 1, and the virtual images formed by the plurality of optical elements are superimposed and visually recognized by the observer 1. The aerial image display device 100 includes the reflecting member 140 which corresponds to at least one optical element 130 among a plurality of optical elements and is installed to interpose the corresponding optical element 130 together with the display region corresponding to the optical element 130. The optical element 130 installed corresponding to the reflecting member 140 transmits the incident light from the corresponding display region toward the reflecting member 140, and reflects the light obtained by reflecting the transmitted light by the reflecting member 140, so that the virtual image is formed. Further, the reflecting member 140 is installed such that the optical path length until the corresponding optical element 130 reflects the incident light from the corresponding display region is larger than the optical path length until another optical element installed on the back side further than the corresponding optical element 130 when viewed from the observer 1 reflects the incident light from the corresponding display region.

Therefore, the virtual image formed by the optical element 130 can be brought closer to the virtual image formed by another optical element installed on the back side further than the optical element 130 when viewed from the observer 1, and thus the aerial image with the more stereoscopic effect can be displayed.

Further, in the present embodiment, the reflecting members 140 are installed corresponding to the two or more optical elements 130, and the reflecting members 140 are installed such that the optical element 130 installed on the front side when viewed from the observer 1 is larger in the optical path length until the incident light from the corresponding display region is reflected. Therefore, it is possible to reduce the distance between the virtual images while causing an arbitrary number of the virtual images to be superimposed and display the aerial image with the more stereoscopic effect.

Second Embodiment

In the first embodiment, the virtual image B2 formed by the optical element 130 is formed such that the light emitted from the display region passes through the optical element 130, the transmitted light is reflected by the reflecting member 140, and the reflected light is reflected by the optical element 130. Therefore, the brightness of the virtual image B2 is attenuated as compared with the display image displayed in the display region. Further, in the first embodiment, since the virtual image B2 formed by the optical element 130 is formed on the front side further than the virtual image B1 formed by the optical element 120 when viewed from the observer 1, the displayed aerial image becomes dark as a whole.

Figure 22:
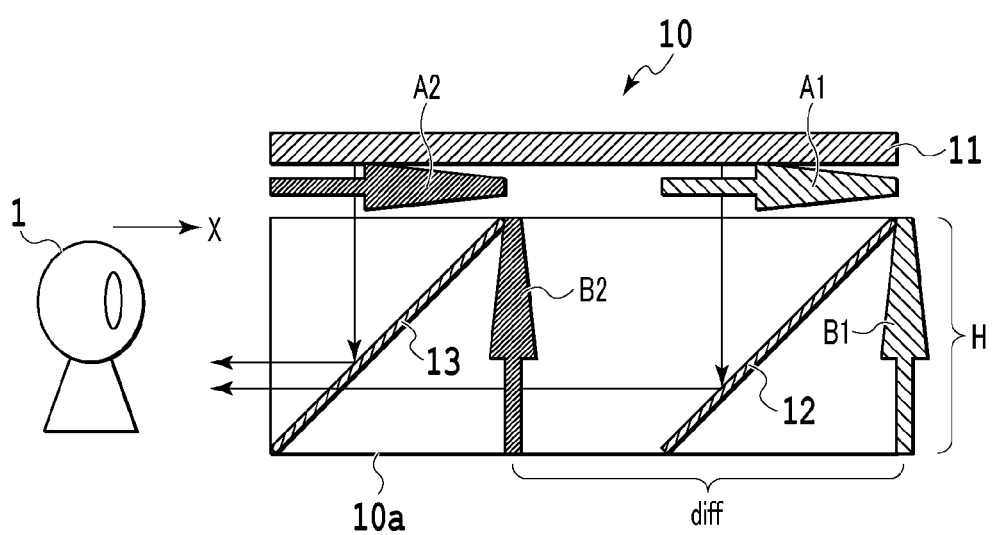
FIG. 22 is a diagram illustrating a configuration example of a relevant aerial image display device.
Figure 23:
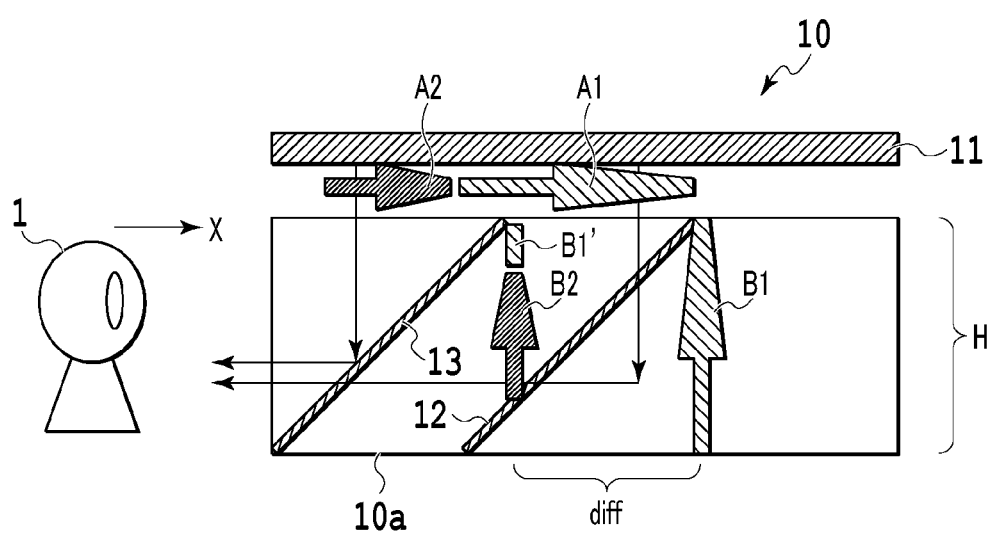
FIG. 23 is a diagram for describing a problem of the aerial image display device illustrated in FIG. 22.

In order to increase the brightness of the virtual image, for example, in the aerial image display device 10 illustrated in FIG. 22, a mirror having a high reflectance (for example, a mirror which totally reflects incident light) may be used as the optical element 12. It is possible to increase the brightness of the virtual image B1 by increasing the reflectance of the optical element 12.

However, in the aerial image display device 10, it is necessary for the optical element 13 to transmit the light emitted from the optical element 12. Therefore, the reflectance of the optical element 13 is unable to be increased. Further, the virtual image B2 is formed on the front side further than the virtual image B1 when viewed from the observer 1. For this reason, it is difficult to display a bright aerial image in the aerial image display device 10. In this regard, in the present embodiment, a configuration for increasing the brightness of the displayed aerial image will be described.

Figure 5:
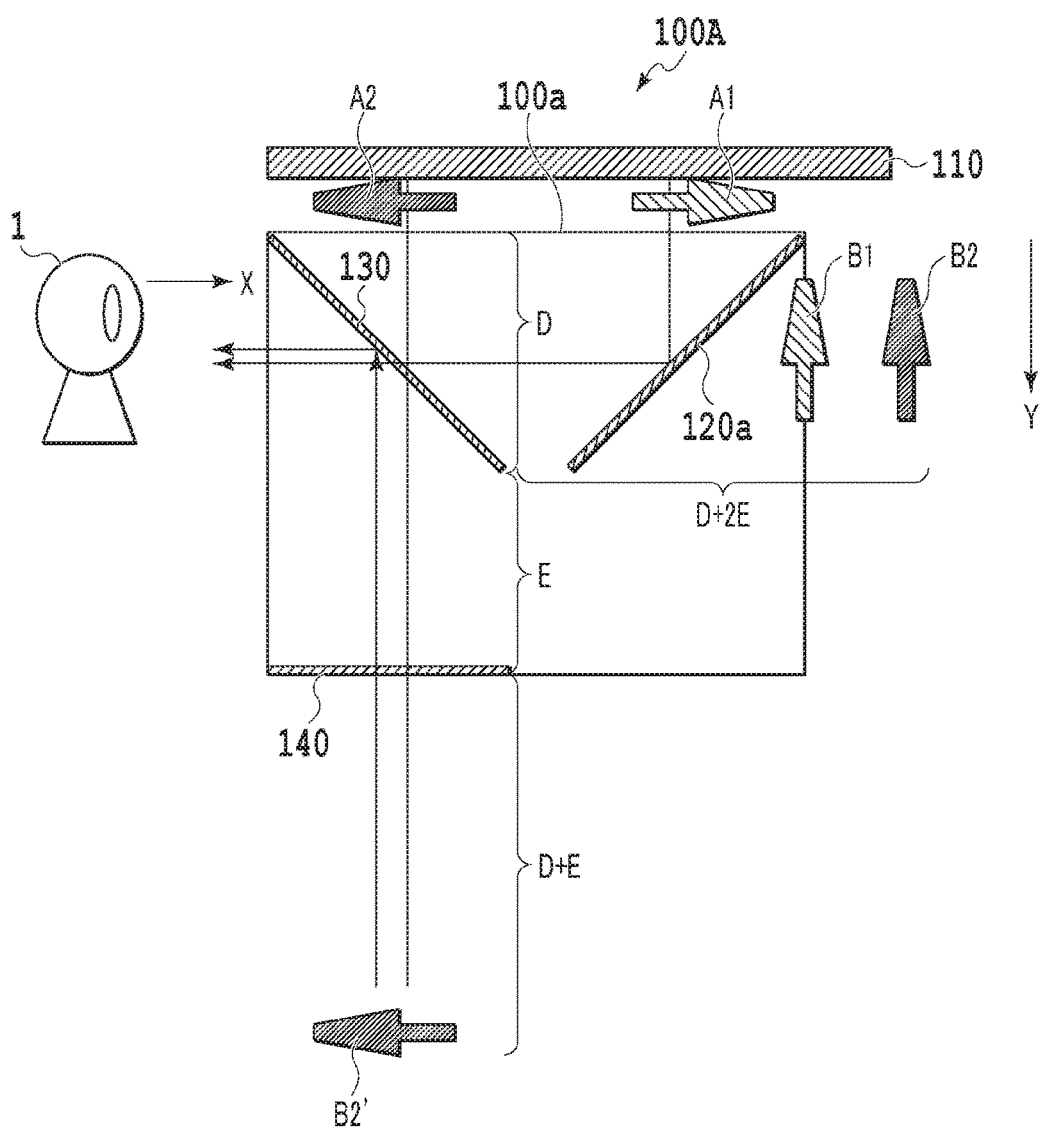
FIG. 5 is a diagram illustrating a configuration example of an aerial image display device according to a second embodiment of the present invention.

FIG. 5 is a side view illustrating a configuration example of an aerial image display device 100A according to a second embodiment of the present invention.

The aerial image display device 100A illustrated in FIG. 5 is different from the aerial image display device 100 illustrated in FIG. 1 in that the optical element 120 is replaced with an optical element 120a, and the position of the reflecting member 140 is changed.

The optical element 120a has higher reflectance than other optical elements (optical element 130) and reflects (for example, totally reflects) the emitted light from the corresponding display region in a direction toward the observer 1. As a specific example of the optical element 120a, for example, a full mirror is mentioned. As the incident light from the display region corresponding to the optical element 120a is reflected toward the observer 1 by the optical element 120a, a virtual image B1 of a display image A1 displayed in the display region corresponding to the optical element 120a is formed at a back side end portion of the optical element 120a when viewed from the observer 1. Here, since the optical element having high reflectance is used as the optical element 120a, the virtual image B1 formed by the optical element 120a is brighter than the virtual image B1 formed in the first embodiment.

The reflecting member 140 is installed at a position away from the back side end portion of the optical element 130 by E in the Y direction when viewed from the observer 1. In other words, the reflecting member 140 is installed at a position away from the top surface of the housing 100a (the display surface of the display device 110) by D+E. Therefore, a virtual image B2' of a display image A2 displayed in the display region corresponding to the optical element 130 is formed at a position away from the reflecting member 140 by D+E in the Y direction. Further, a virtual image B2 of the virtual image B2' is formed at the back side position away from the back side end portion of the optical element 130 by D+E when viewed from the observer 1.

In the aerial image display device 100A, the reflecting member 140 is installed so that the virtual image B2 is formed on the back side further than the virtual image B1 when viewed from the observer 1 (a value of E is adjusted). With this configuration, the brighter virtual image B1 is formed on the front side further than the virtual image B2 when viewed from the observer 1, and thus a brighter aerial image can be displayed.

In the aerial image display device 100A illustrated in FIG. 5, by increasing the distance in the Y direction between the reflecting member 140 and the optical element 130, the virtual image B2 is formed on the back side further than the virtual image B1 when viewed from the observer 1. In this case, the device size of the aerial image display device 100A in the Y direction increases. In this regard, FIG. 6 illustrates a configuration example of an aerial image display device 100A in which an increase in the device size is suppressed.

Figure 6:
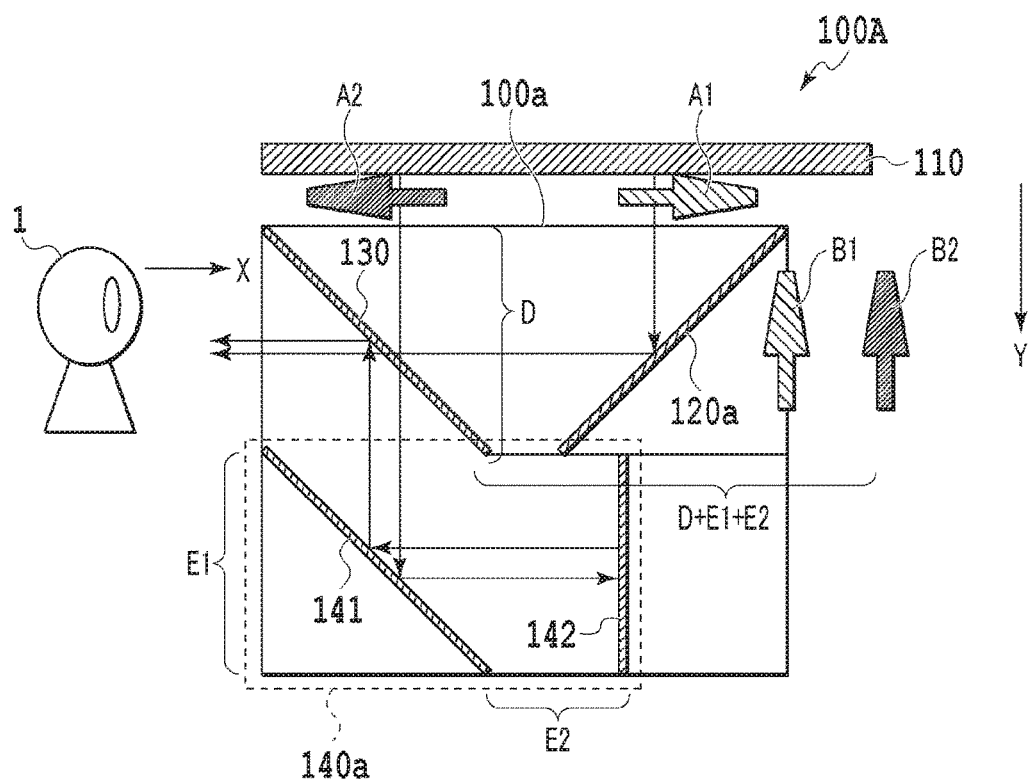
FIG. 6 is a diagram illustrating another configuration example of the aerial image display device according to the second embodiment of the present invention.

The aerial image display device 100A illustrated in FIG. 6 is different from the aerial image display device 100A illustrated in FIG. 5 in that the reflecting member 140 is replaced with a reflecting member 140a. The reflecting member 140a includes mirrors 141 and 142.

The mirror 141 is installed to be substantially parallel to the optical element 130. When view from the observer 1, a position of the back side end portion of the optical element 130 is substantially the same as a position of the front side end portion (upper end) of the mirror 141 in the Y direction.

The mirror 142 is installed on the back side further than the mirror 141 when viewed from the observer 1 and substantially perpendicular to the display surface of the display device 110.

In the reflecting member 140a, the mirror 141 reflects the light passing through the optical element 130 toward the mirror 142. The mirror 142 reflects the reflected light of the mirror 141 toward the mirror 141. The mirror 141 reflects the reflected light of the mirror 142 toward the optical element 130.

Therefore, if a thickness of the mirror 141 in the Y direction is indicated by E1, and a distance between the back side end portion of the mirror 141 when viewed from the observer 1 and the mirror 142 is indicated by E2, a virtual image B2 of a display image A2 displayed in the display region corresponding to the optical element 130 is formed at the back side position away from the back side end portion of the optical element 130 by D+E1+E2. In other words, it is possible to form the virtual image B2 behind the virtual image B1 by adjusting values of E1 and E2, similarly to the aerial image display device 100A illustrated in FIG. 5.

Here, in the aerial image display device 100A illustrated in FIG. 6, a certain length is obtained as the optical path length until the incident light from the corresponding display region to the optical element 130 is reflected toward the observer 1 as the light passing through the optical element 130 is reflected a plurality of times by the reflecting member 140a and then emitted to the optical element 130. Therefore, although a large interval in the Y direction is not provided between the optical element 130 and the reflecting member 140, a certain length can be obtained as the optical path length until the optical element 130 reflects the incident light from the corresponding display region toward the observer 1, and thus it is possible to suppress an increase in the device size in the Y direction.

The configuration of the reflecting member 140a is not limited to the configuration illustrated in FIG. 6. The reflecting member 140a can have an arbitrary configuration as long as the light which is emitted from the display region and then passes through the optical element 130 can be reflected a plurality of times and then emitted to the optical element 130.

As described above, according to the present embodiment, the optical element 120a on the back most side when viewed from the observer 1 has the higher reflectance than other optical elements. Further, the reflecting member 140 is installed such that the virtual image formed by the corresponding optical element 130 is formed on the back side further than the virtual image formed by the optical element 120a when viewed from the observer 1. Therefore, since the virtual image B1 formed by the optical element 120a having the high reflectance is formed on the front side further than the virtual image B2 formed by the optical element 130 when viewed from the observer 1, the displayed aerial image can be brighter.

Further, in the present embodiment, the reflecting member 140a reflects the light passing through the corresponding optical element 130 a plurality of times and then emits the light toward the corresponding optical element 130. Accordingly, the increase in the device size can be suppressed.

The first and second embodiments have been described above with the example in which the optical element 130 is inclined at about 45° with respect to the display surface, and the reflecting member 140 is installed substantially parallel to the display surface, but the present invention is not limited to this example.

Figure 7:
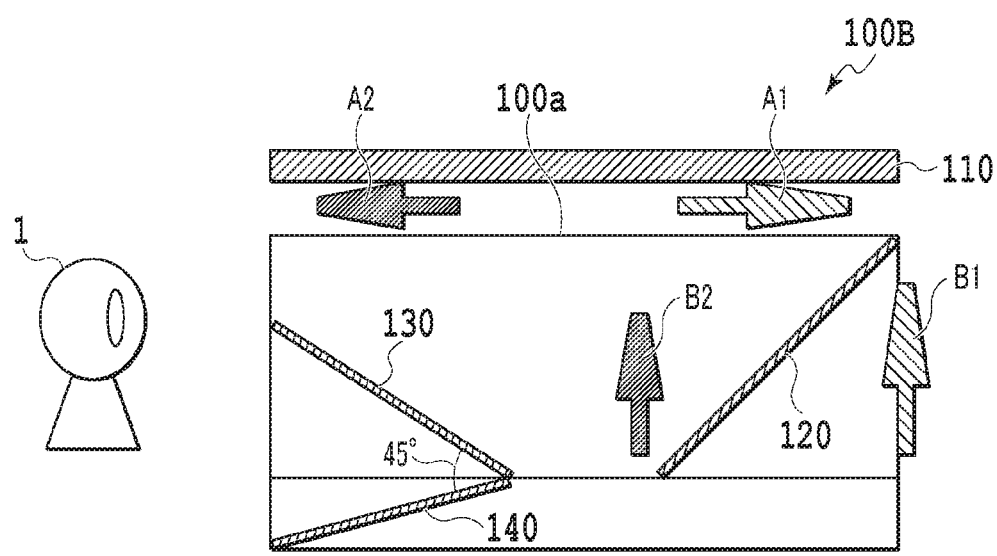
FIG. 7 is a diagram illustrating still another configuration example of the aerial image display device according to the present invention.

For example, if an angle formed by the optical element 130 and the reflecting member 140 is about 45°, and an angle formed by the optical element 130 and the display surface is greater than 0 and less than 90° as in an aerial image display device 100B illustrated in FIG. 7, even when the optical element 130 is inclined back and forth when viewed from the observer 1, it is possible to form the virtual image B2 having no inclination in the X direction when viewed from the observer 1. The reason will be described below with reference to FIG. 8.

Figure 8:
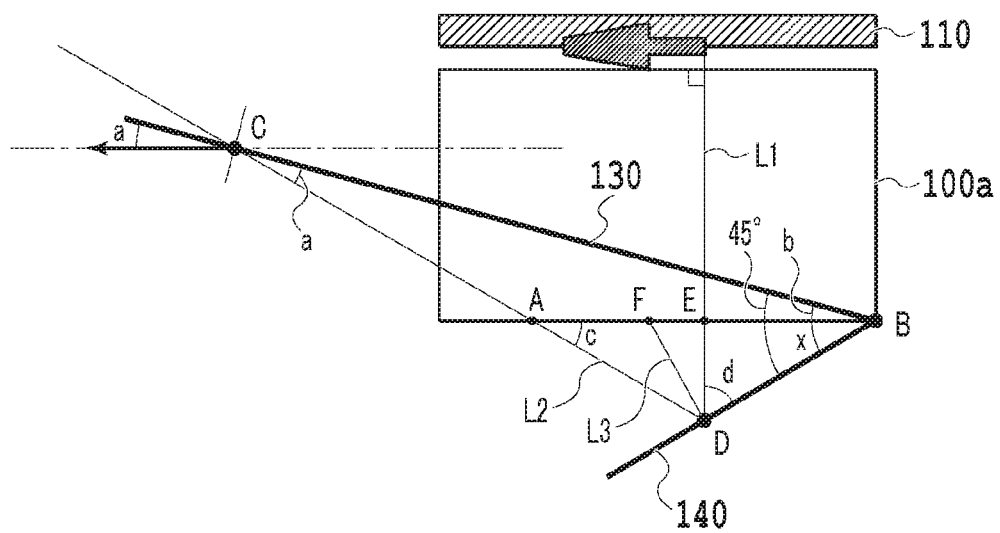
FIG. 8 is a diagram for describing forming of a virtual image in the aerial image display device illustrated in FIG. 7.

FIG. 8 is an enlarged view of the optical element 130 in the aerial image display device 100B illustrated in FIG. 7 and a configuration corresponding to the optical element 130. In FIG. 8, a contact point between the optical element 130 and the reflecting member 140 is indicated by a point B. Further, a crossing point between a perpendicular line L1 extending downward from the display surface of the display device 110 and a lower surface of the housing 100a is indicated by a point E. Further, a crossing point between the perpendicular line L1 and the reflecting member 140 is indicated by a point D. The perpendicular line downward from the display surface of the display device 110 corresponds to the light emitted from the display surface of the display device 110. A crossing point between a straight line L2 corresponding to light obtained when the light emitted from the display surface of the display device 110 is reflected at the point D and the lower surface of the housing 100a is indicated by a point A. Further, a crossing point between the straight line L2 and the optical element 130 is indicated by a point C. A crossing point between a perpendicular line L3 which passes through the point D and is orthogonal to the reflecting member 140 and the lower surface of housing 100a is indicated by a point F. Further, it is assumed that ∠ACB=∠a, ∠CBE=∠b, ∠DAF=∠c, ∠BDE=∠d, and ∠DBE=x.

In this case, ∠EDF=∠90°−∠EFD. Here, in a triangle DFB, because ∠EFD=90°−x, ∠EDF=x. Since an incidence angle is equal to a reflection angle, ∠EDF=∠FDA=x.

Further, because ∠DBC=45°, $$\angle b = 45° - x \quad \text{Formula (1)}.$$

Further, in a triangle DEB, since ∠DEB=90°, $$\angle d = 90° - x \quad \text{Formula (2)}.$$

Further, in a triangle ABC, since an external angle ∠c is equal to a sum of the internal angles, $$\angle c = \angle a + \angle b \quad \text{Formula (3)}$$

Further, in a triangle DAB, since the sum of the internal angles is 180°, $$\angle c = 180° - (2x + d) - x = 180 - 3x - d \quad \text{Formula (4)}$$
$$= 180° - 3x - (90° - x) = 90° - 2x$$

Since Formula (3)=Formula (4), ∠a=90°−2x−∠b=45°−x=∠b, and ∠a=∠b=45°−x.

Therefore, the light reflected at the point D is incident on the point C while forming an angle of 45°−x with the optical element 130. Since the reflection angle and the emittance angle are equal, the angle formed by the light reflected by the optical element 130 and the optical element 130 is 45°−x=∠a=∠b. Therefore, since the light reflected at the point C is emitted in a direction parallel to the lower surface of the housing 100a indicated by an alternate long and short dash line, the virtual image with no inclination can be formed.

Figure 9:
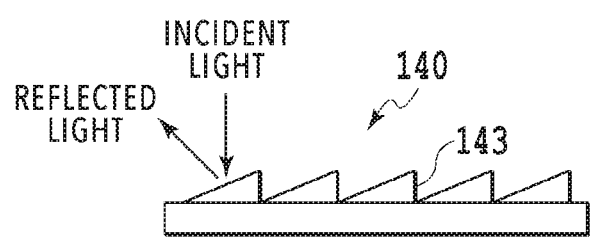
FIG. 9 is a diagram illustrating another configuration example of a reflecting member according to the present invention.

Instead of inclining both the optical element 130 and the reflecting member 140, a mirror plate in which inclined micro mirrors 143 are arranged as illustrated in FIG. 9 may be used as the reflecting member 140, and only the optical element 130 may be inclined back and forth from 45° in a state in which the reflecting member 140 and the display surface of the display device 110 are parallel to each other. In the reflecting member 140 illustrated in FIG. 9, incident light in the vertical direction is inclined and reflected at a predetermined angle by the micro mirror 143. Therefore, it is possible to form the virtual image with no inclination by adjusting an inclination of an oblique surface of the micro mirror 143. In a case in which the reflecting member 140 illustrated in FIG. 9 is used, an angle formed by the light reflected by the reflecting member 140 (the micro mirror 143) and the optical element 130 needs to be 45° or more.

Figure 10:
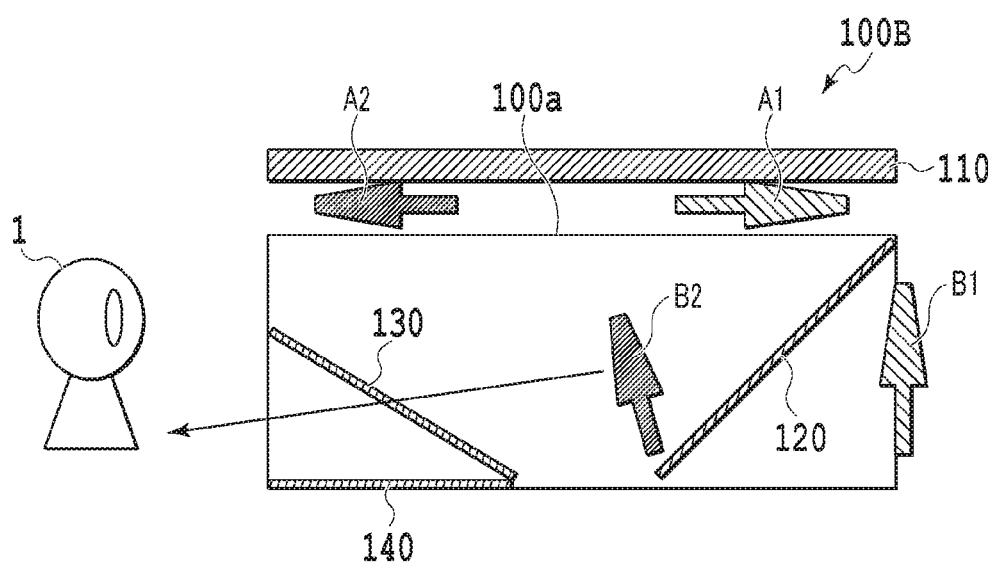
FIG. 10 is a diagram illustrating still another configuration example of the aerial image display device according to the present invention.

Further, as illustrated in FIG. 10, only the optical element 130 may be inclined back and forth from 45° in a state in which the reflecting member 140 is parallel to the display surface of the display device 110. If only the optical element 130 is inclined from 45°, a virtual image B1 formed by the optical element 130 is also inclined back and forth when viewed from the observer 1 as the angle formed by the optical element 130 and the display surface deviates from 45°. In this case, it is possible to form the virtual image B1 with no inclination by performing correction (for example, trapezoidal correction) of compensating the inclination of the virtual image B1 with respect to the display image displayed by the display device 110 in accordance with the angle deviated from a case in which the angle formed together with the display surface is 45°. Further, in this case, it is necessary for the angle formed by the optical element 130 and the display surface to be greater than 0 and less than 90°.

By inclining the optical element 130 and the reflecting member 140, it is possible to suppress an increase in the device size.

Third Embodiment

In a case in which a plurality of optical elements 120 and 130 are arranged along the observation direction (the X direction) of the observer 1, and the virtual images formed by the optical elements 120 and 130 are superimposed and visually recognized by the observer 1 as in the first and second embodiments, if the length of the display device 110 in the X direction is constant, as the number of optical elements 120 and 130 (the number of layers) increases, the X-direction lengths of the display regions of the display surface of the display device 110 allocated to the optical elements 120 and 130 are reduced. If the X-direction length of the display regions allocated to the optical elements 120 and 130 (the display regions corresponding to the optical elements 120 and 130) are reduced, the heights of the virtual images formed by the optical elements 120 and 130 are reduced, and it is difficult to display the aerial image with the realistic sensation. The present embodiment will be described with a configuration capable of displaying the aerial image with the realistic sensation even when a total of the number of optical elements 120 and 130 increases.

Figure 11:
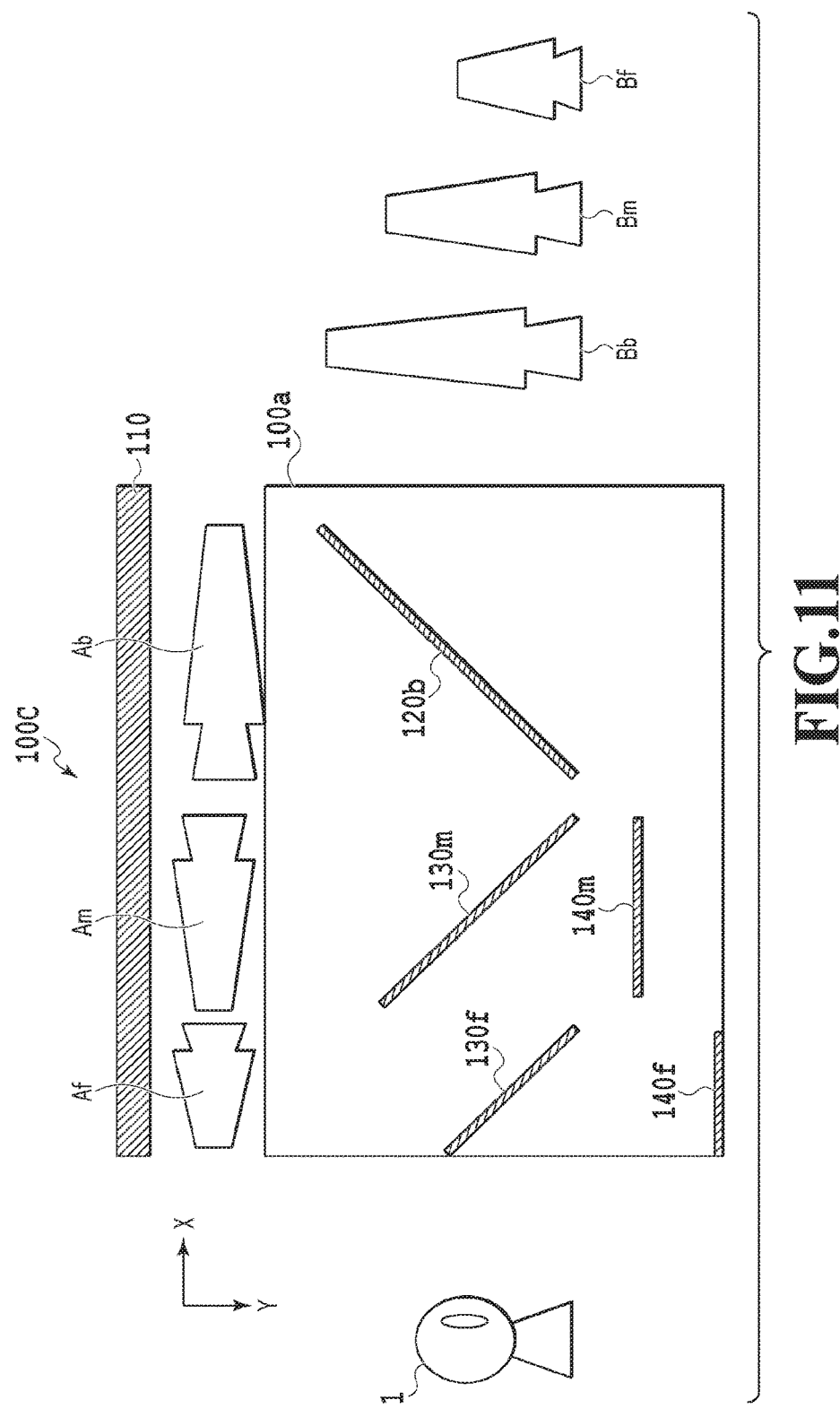
FIG. 11 is a diagram illustrating a configuration example of an aerial image display device according to a third embodiment of the present invention.

FIG. 11 is a diagram illustrating a configuration example of an aerial image display device 100C according to a third embodiment of the present invention.

The aerial image display device 100C illustrated in FIG. 11 includes one optical element 120b, two optical elements 130 (optical elements 130f and 130m), and reflecting members 140 (140f and 140m) corresponding to the respective optical elements 130, similarly to the aerial image display device 100 illustrated in FIG. 4.

The optical element 120b corresponds to the optical element 120, the optical element 130f corresponds to the optical element 130-2, and the optical element 130m corresponds to the optical element 130-1. Further, the reflecting member 140f corresponds to the reflecting member 140-2, and the reflecting member 140m corresponds to the reflecting member 140-1.

In other words, in the aerial image display device 100C according to the present embodiment, the optical element 130*f*, the optical element 130*m*, and the optical element 120*b* are sequentially arranged along the observation direction of the observer 1 (a direction from the front side to the back side of the observer 1) in this order.

The reflecting member 140*f* corresponds to the reflecting member 140-2 and is installed at a position away from the back side end portion of the reflecting member 130*f* in the X direction by a predetermined distance. The reflecting member 140*m* corresponds to the reflecting member 140-1 and is installed at a position away from the back side end portion of the reflecting member 130*m* in the X direction by a predetermined distance. Here, a distance between the reflecting member 140*f* and the optical element 130*f* is larger than a distance between the reflecting member 140*m* and the optical element 130*m*.

Therefore, in the aerial image display device 100C, similarly to the aerial image display device 100 illustrated in FIG. 4, a virtual image Bf of a display image Af displayed in the display region corresponding to the optical element 130*f* is formed by the optical element 130*f*, a virtual image Bm of a display image Am displayed in the display region corresponding to the optical element 130*m* is formed by the optical element 130*m*, a virtual image Bb of a display image Ab displayed in the display region corresponding to the optical element 120*b* is formed by the optical element 120*b*, and the virtual images Bb, Bm, and Bf are superimposed and visually recognized by the observer 1.

Here, in the aerial image display device 100 illustrated in FIG. 4, if the sizes of the optical elements 120, 130-1, and 130-2 are the same, and the lower ends of the optical elements 120, 130-1, and 130-2 have the same height, the heights of the upper ends of the respective optical elements 120 are the same. Therefore, the sizes of the surfaces of the optical elements 120, 130-1, and 130-2 which face the display surface of the display device 110 are also equal, and as a result, the sizes of the display regions corresponding to the optical elements 120, 130-1, and 130-2 are equal. In other words, in the aerial image display device 100 illustrated in FIG. 4, the display regions of the display device 110 are equally allocated to the optical elements 120, 130-1, and 130-2.

For this reason, in the aerial image display device 100 illustrated in FIG. 4, if the number of the optical elements 120 and 130 in which the formed virtual images are superimposed increases, the X-direction lengths of the display regions allocated to the optical elements 120 and 130 are reduced, it is difficult to display the aerial image with the realistic sensation.

On the other hand, in the aerial image display device 100C according to the present embodiment, the sizes of the optical elements 120*b*, 130*f*, 130*m* are different, the optical element 130*m* is larger than the optical element 130*f*, and the optical element 120*b* is larger than the optical element 130*m*. Further, if the lower ends of the optical elements 120*b*, 130*f*, and 130*m* are assumed to have the same height, the optical elements 120*b*, 130*f*, and 130*b* are arranged such that the position of the upper end of the optical element on the back side when viewed from the observer 1 is higher.

Figure 12:
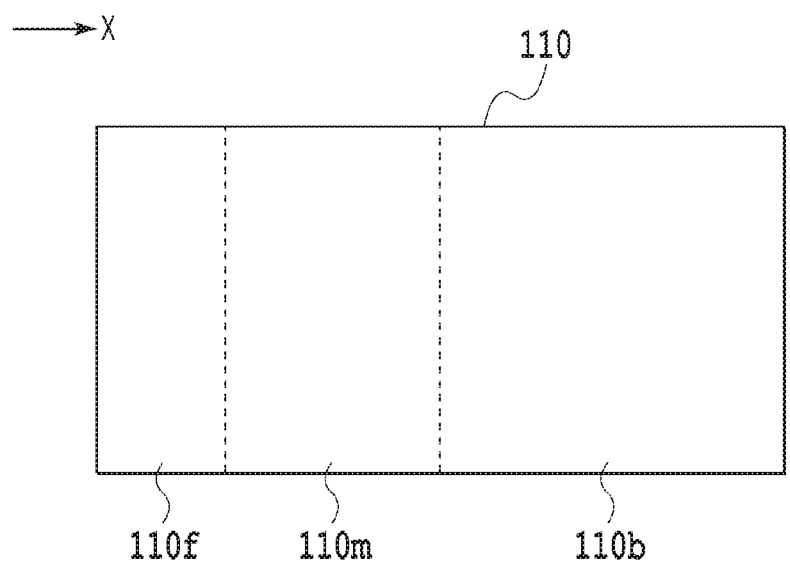
FIG. 12 is a top view of a display surface of the display device illustrated in FIG. 11.

With this configuration, the sizes (the X-direction lengths) of the optical elements 120*b*, 130*f*, and 130*b* which face the display surface of the display device 110 are also different. Specifically, as illustrated in FIG. 12, an X-direction length of a display region 110*m* corresponding to the optical element 130*m* is larger than an X-direction length of a display region 110*f* corresponding to the optical element 130*f*, and an X-direction length of a display region 110*b* corresponding to the optical element 120*b* is larger than an X-direction length of the display region 110*m* corresponding to the optical element 130*m*. In other words, when viewed from the observer 1, the display region corresponding to the optical element on the back side is large in a length along the observation direction (the X direction).

Then, as illustrated in FIG. 11, the positions of the reflecting members 140*f* and 140*m* are adjusted so that the virtual image formed by the optical element on the back side when viewed from the observer 1 is formed on the front side. Accordingly, a virtual image with a smaller height (a Y-direction size) is formed on the back side when viewed from the observer 1. Here, even when the height of the virtual image on the back side when viewed from the observer 1 is reduced, it is possible to cause the observer 1 to visually recognize the aerial image with the more realistic sensation without impairing the perspective of the observer 1.

For example, a size or an arrangement of each of the optical elements 120 and 130 can be decided as follows.

Figure 13:
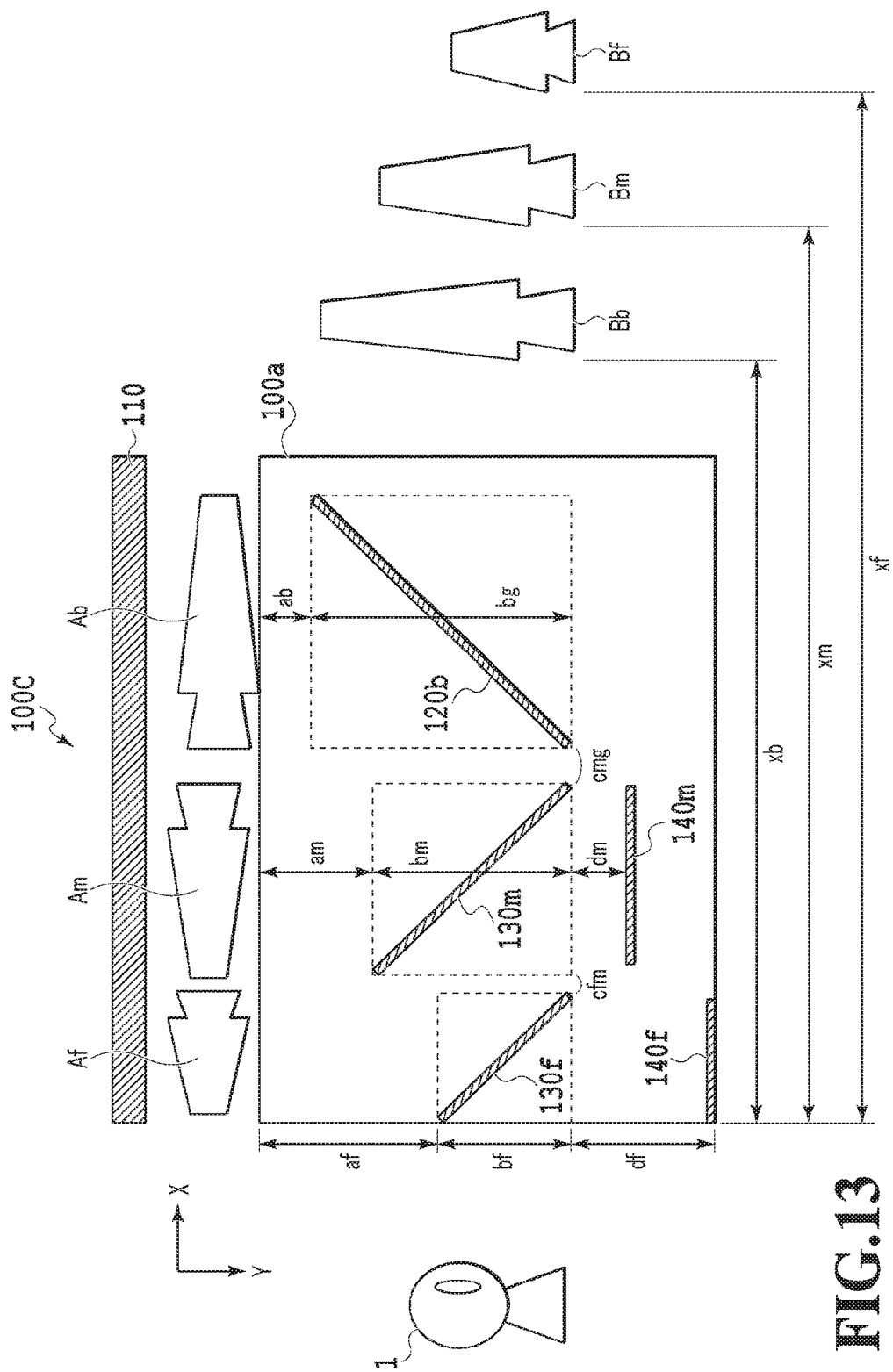
FIG. 13 is a diagram for describing an arrangement example of optical elements in the aerial image display device illustrated in FIG. 11.

If the length of the optical element 130*f* in the Y direction is indicated by bf, the length of the optical element 130*m* in the Y direction is indicated by bm, the length of the optical element 120*b* in the Y direction is indicated by bg, a distance between the upper end of the optical element 130*f* and the surface of the display device 110 is indicated by af, a distance between the optical element 130*m* and the display surface of the display device 110 is indicated by am, a distance between the optical element 120*b* and the display surface of the display device 110 is indicated by ab, a distance between the lower end of the optical element 130*f* and the reflecting member 140*f* is indicated by df, a distance between the lower end of the optical element 130*m* and the reflecting member 140*m* is indicated by dm, a distance between the optical element 130*f* and the optical element 130*m* along the X direction is indicated by cfm, and a distance between the optical element 130*m* and the optical element 120*b* along the X direction is indicated by cmg as illustrated in FIG. 13, the distance xf from the end portion of the housing 100*a* on the observer 1 side to the virtual image Bf, the distance xm from the end portion of the housing 100*a* on the observer 1 side to the virtual image Bm, and the distance xb from the end portion of the housing 100*a* on the observer 1 side to the virtual image Bb can be obtained by the following Formulas (5) to (7).

$$xf = bf + df + (af + bf + df) \quad \text{Formula (5)}$$

$$xm = (bf + cfm + bm) + dm + (am + bm + dm) \quad \text{Formula (6)}$$

$$xb = (bf + cfm + bm + cmg) + bg + ab \quad \text{Formula (7)}$$

For example, if bf=20 mm, bm=30 mm, bg=40 mm, of=28 mm, am=18 mm, ab=8 mm, df=30 mm, dm=7.5 mm, cfm=5 mm, and cmg=5 mm, xf=128 mm, xm=118 mm, and xb=108 mm are obtained by Formulas (5) to (7), and the virtual image formed by the optical element on the front side when viewed from the observer 1 can be formed on the back side when viewed from the observer 1.

As described above, in the aerial image display device 100C according to the present embodiment, the display region corresponding to the optical element on the back side when viewed from the observer 1 is large in the length along the observation direction (the X direction), and the optical element on the back side when viewed from the observer 1 is high in the position of the upper end of the optical element.

Therefore, the virtual image formed by the optical element on the front side when viewed from the observer 1 is formed on the back side when viewed from the observer 1, and thus it is possible to cause the observer 1 to visually recognize the aerial image with the more realistic sensation without impairing the perspective.

In FIGS. 11 and 13, the optical element on the front side when viewed from the observer 1 is small, but among optical elements having different sizes, an optical element on the front side when viewed from the observer 1 may be large, or an optical element on the middle may be largest. In both cases, except for the optical element located at the innermost position when viewed from the observer 1, the optical elements are half mirrors or transparent plates.

The present invention has been described with reference to the appended drawings and the embodiments, but it should be noted that those skilled in the art can easily make various variations or modifications on the basis of the present disclosure. Therefore, it should be noted that these variations or modifications are included within the scope of the present invention.

As another aerial image display device of a related art which projects the virtual image of the display image displayed on the display surface onto a space, for example, an aerial image display device proposed in Non-Patent Literature 2 is also known. This is an aerial image display device which causes the observer to perceive a three-dimensional image with a different depth direction by changing a luminance ratio of two two-dimensional images (display images) having different depth positions. The three-dimensional image is a sort of virtual image displayed at a position different from the display surface. The aerial image display device disclosed in Non-Patent Literature 2 can perceive a plurality of three-dimensional images having different depths and can present videos in multiple layers.

Figure 24:
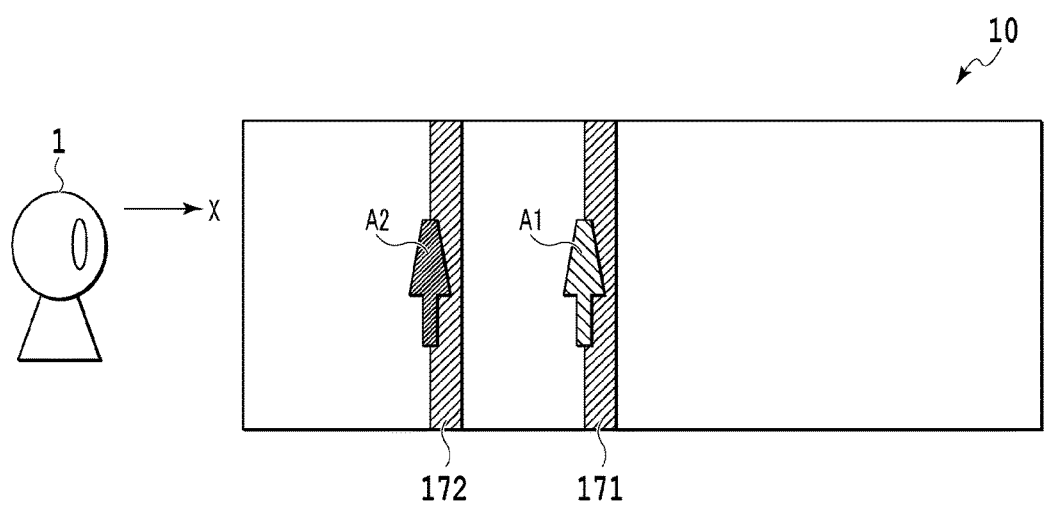
FIG. 24 is a diagram illustrating a configuration example of a related conventional aerial image display device.

FIG. 24 is a side view illustrating a configuration example of an aerial image display device 10 disclosed in Non-Patent Literature 2. A direction from the observer 1 side to the aerial image display device 10 (the observation direction of the observer 1) is the X direction. The aerial image display device 10 includes a front side display 172 (the front side when viewed from the observer 1) for displaying a display image A2 and a back side display 171 (the back side when viewed from the observer 1) for displaying a display image A1. In order to perceive it as a three-dimensional image, it is necessary for the observer to view the display image A2 and the display image A1 which are superimposed. Therefore, at least the display 172 is a transparent display. Therefore, it is difficult to increase a degree of freedom of design of the aerial image display device 10.

In the aerial image display device 10, the depth of the three-dimensional image is decided in accordance with the luminance ratio between the display image A2 and the display image A1. Since the set luminance ratio changes, it is difficult to cause a real object (for example, a figure, a relief, or the like) and a three-dimensional image to be superimposed on each other in the aerial image display device 10. In the aerial image display device 10, a situation in which another display image of the back side display 171 (the display image other than the display image A1) is hidden by the display image A2 of the front display 172 (hereinafter, concealment) may occur.

On the other hand, in an embodiment to be described below, it is possible to implement an aerial image display device which is high in the degree of freedom of design, is capable of causing the real object and the virtual image to be superimposed on each other, and does not undergo the concealment.

Fourth Embodiment

Figure 14:
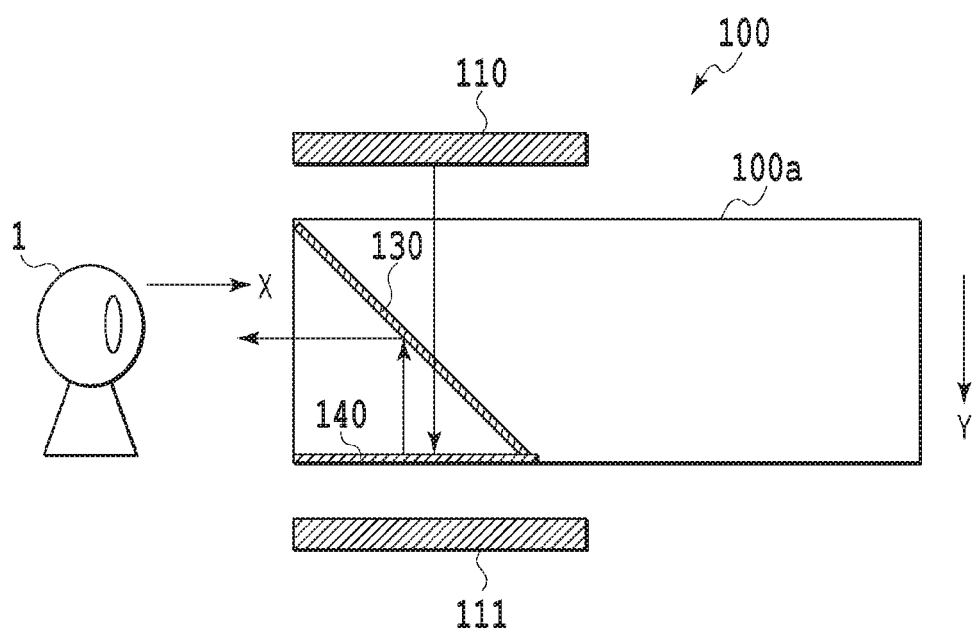
FIG. 14 is a diagram illustrating a configuration example of an aerial image display device according to a fourth embodiment of the present invention.

FIG. 14 is a side view illustrating a configuration example of an aerial image display device 100 according to a fourth embodiment of the present invention. The aerial image display device 100 illustrated in FIG. 14 displays an aerial image by causing virtual images of a plurality of the display images displayed on display surfaces of the display device 110 and a display device 111 to be superimposedly displayed back and forth for the observer 1 observing in a direction substantially horizontal to the display surfaces. Here, the display device 110 corresponds to a first display device of the present invention. Further, the display device 111 corresponds to a second display device of the present invention. The display device 111 is installed to face the display device 110. In the present embodiment, the display device 110 and the display device 111 are installed substantially in parallel.

In the aerial image display device 100 illustrated in FIG. 14, the display device 110 is installed on one side of the housing 100*a* of the aerial image display device 100 (the top surface of the housing 100*a* in FIG. 14) so that the display surface faces the housing 100*a* side (the display surface faces downward in FIG. 14). Further, the display device 111 is installed on another surface of the housing 100*a* of the aerial image display device 100 (the lower surface of the housing 100*a* in FIG. 14) so that the display surface faces the housing 100*a* side (the display surface faces upward in FIG. 14). In the housing 100*a*, an opening is installed on the surfaces facing the display device 110 and the display device 111 (the top surface and the lower surface of the housing 100*a* in FIG. 14). The opening is installed corresponding to the regions (display regions) of the display surfaces of the display device 110 and the display device 111, and the light emitted from the display regions of the display device 110 and the display device 111 are incident on the inside of the housing 100*a*. The opening may be blocked or covered with a transparent member. Each of the display device 110 and the display device 111 is, for example, a smartphone, a tablet terminal, and the like but not limited thereto, and each of the display device 110 and the display device 111 may be a display device having a display surface of a larger size. Further, the display device 110 and the display device 111 may be the same type of display devices or different types of display devices. Further, at least one of the display device 110 and the display device 111 may be formed integrally with the aerial image display device 100. In FIG. 14, for the sake of convenience, the display device 110 and the top surface of the housing 100*a* are illustrated to be disposed with a predetermined gap therebetween, but practically, the display device 110 and the top surface of the housing 100*a* are substantially in close contact with each other. On the other hand, the display device 111 and the lower surface of the housing 100*a* are disposed with a predetermined gap therebetween (d1 in FIG. 15 to be described later), but the display device 111 and the lower surface of the housing 100*a* may be substantially in close contact with each other. Hereinafter, a direction from a surface of the housing 100*a* on the observer 1 side to a surface opposite to the surface of the housing 100*a* on the observer 1 side (an observation direction of the observer 1) is referred to as an "X direction." Hereinafter, a direction in which the display surface of the display device 110 faces is referred to as a "Y direction." Further, in the present embodiment, the display region of the display device 110 corresponds to a first display region of the present invention. Further, in the present embodiment, the display region of the display device 111 corresponds to a second display region of the present invention.

The aerial image display device 100 illustrated in FIG. 14 includes optical elements 130 and 140. The optical elements 130 and 140 are installed corresponding to the display regions of the display devices 110 and 111. The optical element 130 corresponds to a first optical element of the present invention. Further, the optical element 140 corresponds to a second optical element of the present invention.

The optical element 130 is installed in a space between the display device 110 and the display device 111 obliquely with an angle of about 45° in the X direction when viewed from the display surface of the display device 110. Therefore, the optical element 130 forms an angle of about 45° with the optical element 140. The optical element 130 transmits the light (light 201 illustrated in FIG. 2) emitted from the display region of the display surface corresponding to the optical element 130 (the display surface of the display device 110). The optical element 130 reflects the light (the light 202 illustrated in FIG. 2) obtained by reflecting the transmitted light by the optical element 140 and emits the light (light 203 illustrated in FIG. 2) in a direction toward the observer 1. Further, the optical element 130 transmits the light (the light 204 illustrated in FIG. 2) toward the observer 1 from the back side of the optical element 130.

The optical element 140 is installed in a space between the display device 110 and the display device 111. Further, the optical element 140 is installed substantially parallel to the display surfaces of the display device 110 and the display device 111. The optical element 140 transmits the emitted light from the display region of the display surface corresponding to the optical element 140 (the display surface of the display device 111). Further, the optical element 140 reflects the emitted light from the display device 110 that has passed through the optical element 130. Specific examples of the optical elements 130 and 140 include a half mirror and a transparent plate.

Figure 15:
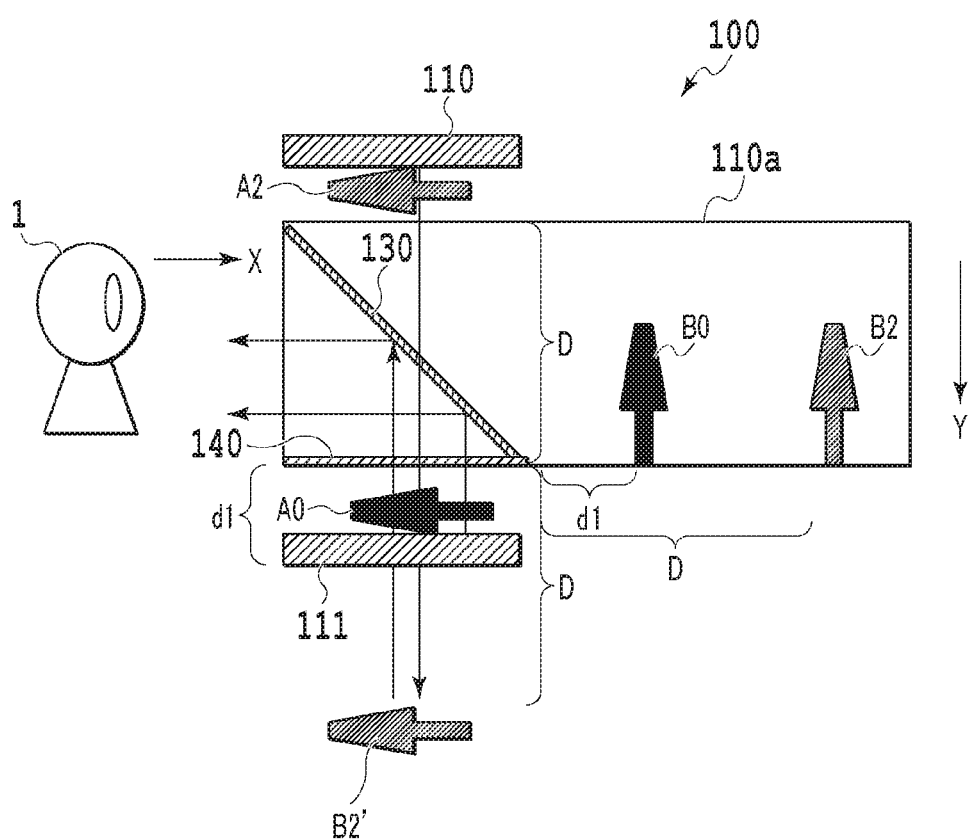
FIG. 15 is a diagram for describing display of an aerial image performed by the aerial image display device illustrated in FIG. 14.

FIG. 15 is a diagram for describing display of an aerial image performed by the aerial image display device 100. Hereinafter, a height of the housing 100a (a length in the Y direction) is indicated by D.

A display image A2 is displayed on the display device 110. The emitted light from the display device 110 passes through the optical element 130 and is incident on the optical element 140. This corresponds to what a virtual image B2' of the display image A2 is virtually formed at a position away from the optical element 140 by D in the Y direction. The optical element 140 reflects the light from the display device 110 that has passed through the optical element 130. This corresponds to what light from the virtual image B2' passes through the optical element 140 and is incident on the optical element 130. The light going from the optical element 140 to the optical element 130 is reflected toward the observer 1 by the optical element 130. Therefore, from viewed from the observer 1, the virtual image B2 (a reflection image of the virtual image B2' formed by the optical element 130) is formed at a position away from the back side end portion of the optical element 130 by D in the X direction. In other words, the virtual image B2 is formed at a position corresponding to the distance (D in the example of FIG. 15) between the display device 110 and the optical element 140 along the observation direction of the observer 1 from the optical element 130. As described above, the optical element 130 forms the virtual image B2 by indirectly reflecting the emitted light from the display region of the corresponding display surface (the display surface of the display device 110) (after the light is reflected by the optical element 140).

Further, a display image A0 is displayed on the display device 111. The emitted light from the display device 111 passes through the optical element 140, goes toward the optical element 130, and is reflected toward the observer 1 by the optical element 130. The display device 111 is installed at a position away from the optical element 140 by d1. Therefore, when viewed from the observer 1, a virtual image B0 of the display image A0 is formed at a position away from the back side end portion of the optical element 130 by d1 in the X direction. In other words, the virtual image B0 is formed at a position corresponding to the distance (d1 in the example of FIG. 15) between the display device 111 and the optical element 140 along the observation direction of the observer 1 from the optical element 130.

The virtual image B2 is formed at a position away from the back side end portion of the optical element 130 by D in the X direction. Further, the virtual image B0 is formed at a position away from the back side end portion of the optical element 130 by d1 in the X direction. It is possible to cause the virtual image B0 and the virtual image B2 to be superimposedly displayed without causing interference by adjusting the distance (d1) between the display device 111 and the optical element 140. Since the virtual image B0 and the virtual image B2 are superimposedly displayed, the observer 1 can visually recognize the aerial image with the stereoscopic effect.

In the example of FIG. 15, since d1 is smaller than D, the superimposing is performed so that the virtual image B0 is ahead of the virtual image B2 when viewed from the observer 1. Here, if d1 is set to be larger than D, it is possible to cause the virtual image B0 and the virtual image B2 to be superimposedly displayed so that the virtual image B0 is displayed on the back side further than the virtual image B2 when viewed from the observer 1.

Here, the virtual image B0 is formed by reflecting the emitted light from the display device 111 by the optical element 130 inclined with an angle of about 45° in the X direction when viewed from the display surface of the display device 110. Therefore, the display image A0 is an image obtained by inverting the actual display target image left and right (back and forth on a paper plane) and upside down (the X direction in FIG. 15). The virtual image B2 is formed by reflecting the emitted light from the display device 110 by the optical element 130 and the optical element 140. Therefore, the display image A2 is an image obtained by inverting an actual display target image upside down.

Further, the display devices 110 and 111 display the backgrounds of the display images A0 and A2 in black. The black background portion is capable of reflecting light. For example, the light emitted from the display device 110 passes through the optical element 130 and is reflected by the optical element 140. However, part of the light may pass through the optical element 140 and be incident on the display device 111. At this time, although part of the light is incident on the display device 111, it is reflected by the black background portion, and thus the light emitted from the display device 110 can be directed toward the observer 1 without being substantially damaged.

As described above, in the aerial image display device 100 according to the present embodiment, since the optical elements 130 and 140 are used, the display device 110 and the display device 111 need not be arranged in the observation direction of the observer 1. Therefore, the aerial image display device 100 need not use a transparent display. As the display device 110 and the display device 111, for example, a smartphone or a tablet terminal whose display portion is a LCD, an organic EL display, or the like can be used, and the aerial image display device 100 according to the present embodiment has a high degree of freedom of design.

In the aerial image display device 100 according to the present embodiment, the display image of the display device 110 and the display image of the display device 111 are different display images for forming the virtual images, and it is unnecessary to use two display images whose luminance ratio is adjusted in order to generate one virtual image. In the aerial image display device 100 according to the present embodiment, even when the real object is placed in a space in which the virtual image is generated, there is no influence on the display device 110 and the display device 111. Therefore, the aerial image display device 100 according to the present embodiment can cause the real object and the virtual image to be superimposed.

Further, in the aerial image display device 100 according to the present embodiment, the display device 110 and the display device 111 are not arranged in the space observed by the observer 1 (the space in which the virtual image is generated). Therefore, there is no concealment in the aerial image display device 100 according to the present embodiment. Therefore, the aerial image display device 100 according to the present embodiment has the effects in that the degree of freedom of design is high, it is possible to cause the real object and the virtual image to be superimposed, and there is no concealment.

Fifth Embodiment

Figure 16:
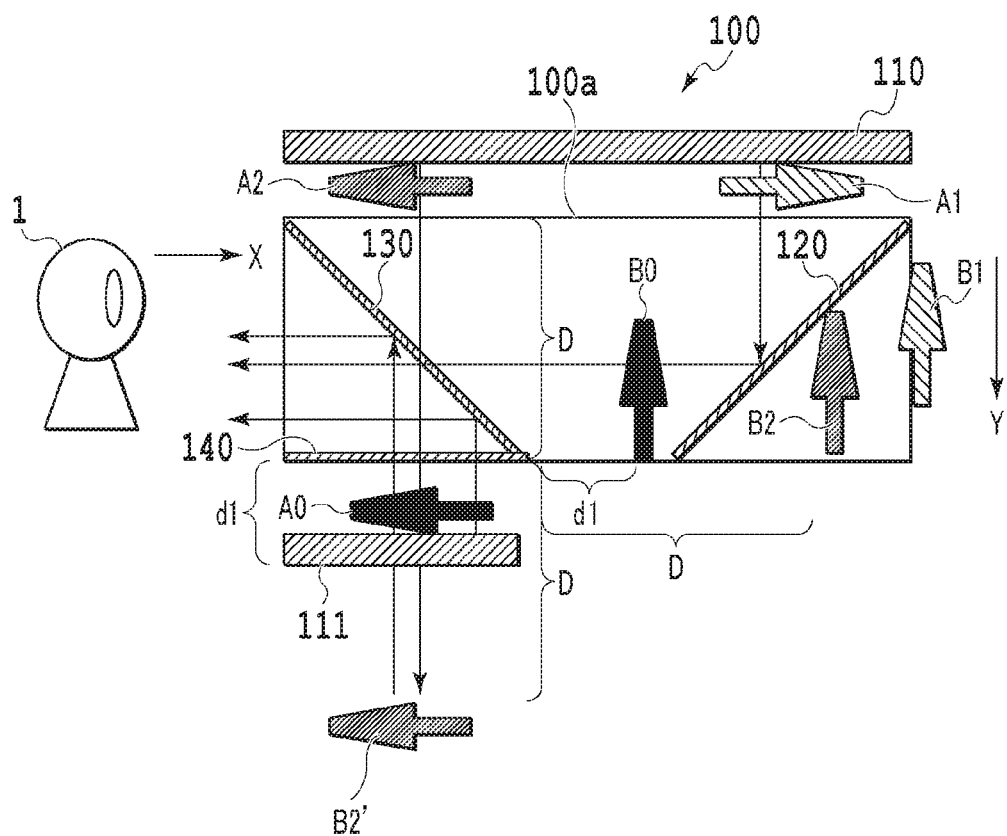
FIG. 16 is a diagram for describing a configuration of an aerial image display device and display of an aerial image according to a fifth embodiment of the present invention.

FIG. 16 is a side view illustrating a configuration example of an aerial image display device 100 according to a fifth embodiment of the present invention. The aerial image display device 100 according to the present embodiment includes an optical element 120 in addition to the configuration of the aerial image display device 100 (see FIG. 15) according to the fourth embodiment. In the present embodiment, the display surface of the display device 110 extends in the X direction from a front side end portion of the optical element 130 to a back side end portion of the optical element 120. The display device 110 causes the display images to be individually displayed in different display regions of the display surfaces corresponding to the optical elements 120 and 130. In FIG. 16, the same elements as those in FIG. 15 are denoted by the same reference numerals. Detailed description of these elements will be omitted for avoiding redundant description.

As illustrated in FIG. 16, the optical elements 120 and 130 are installed corresponding to different display regions of the display surface of the display device 110 and are sequentially arranged along the display surface in the observation direction of the observer 1. In FIG. 16, when viewed from the observer 1, the optical element 130 is installed on the front side, and the optical element 120 is installed on the back side.

Unlike the optical element 130, the optical element 120 is installed obliquely with an angle of about 45° in the −X direction when viewed from the display surface of the display device 110 and reflects the emitted light from the display region of the display surface corresponding to the optical element 120 in a direction toward the observer 1. Specific examples of the optical element 120 include a half mirror and a transparent plate. The optical element 120 corresponds to a third optical element of the present invention.

As illustrated in FIG. 16, the emitted light from the display region of the display surface (the display surface of the display device 110) corresponding to the optical element 120 is reflected toward the observer 1 by the optical element 120. A virtual image B1 of a display image A1 displayed in this display region is formed at a position of the back side end portion of the optical element 120 when viewed from the observer 1. As described above, the optical element 120 forms the virtual image B1 by directly reflecting the incident light from the corresponding display region. The display region corresponding to the optical element 120 corresponds to the third display region of the present invention.

Here, the optical element 130 transmits the light reflected by the optical element 120 (see the light 204 in FIG. 15). As described in the fourth embodiment, the virtual image B0 and the virtual image B2 are superimposedly displayed for the observer 1, but in the present embodiment, the virtual image B1 is further superimposedly displayed on the back side of the virtual image B2.

Here, a positional relation between the virtual image B1 and the virtual image B2 will be described in detail. As illustrated in FIG. 16, when viewed from the observer 1, the virtual image B2 is formed at a position away from the back side end portion of the optical element 130 by D in the X direction. On the other hand, the virtual image B1 is formed at a position of the back side end portion of the optical element 120. Therefore, the distance between the virtual image B1 and the virtual image B2 can be set to be smaller than the height of the virtual image by adjusting the distance between the optical element 120 and the optical element 130. Therefore, it is possible to display the aerial image with the more stereoscopic effect. Further, it is possible to cause the virtual image B1 and the virtual image B2 to be superimposedly displayed without causing interference by adjusting the distance between the optical element 120 and the optical element 130.

Here, the virtual image B1 is formed by reflecting the emitted light from the display device 110 by the optical element 120 inclined with an angle of about −45° in the X direction when viewed from the display surface of the display device 110. Therefore, the display image A1 is an image obtained by inverting an actual display target image left and right (back and forth on a paper plane).

As described above, the aerial image display device 100 according to the present embodiment includes the optical element 120 and thus can cause the virtual image B1 to be further superimposedly displayed on the back side of the virtual image B2. Therefore, in addition to the effects of the fourth embodiment, the aerial image display device 100 according to the present embodiment has the effect in that it is possible to display the aerial image with the more stereoscopic effect. At this time, the aerial image display device 100 according to the present embodiment can display the aerial image with the more stereoscopic effect by adjusting the distance between the optical element 120 and the optical element 130 and setting the distance between the virtual image B1 and the virtual image B2 to be smaller than the height of the virtual image.

Sixth Embodiment

Figure 17:
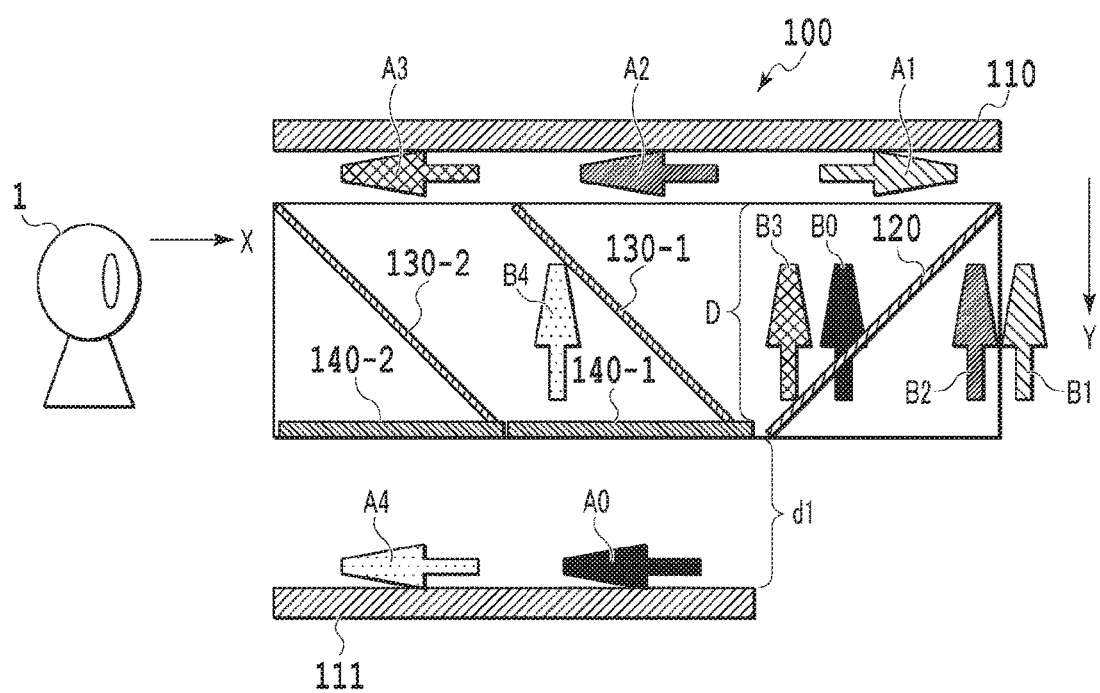
FIG. 17 is a diagram for describing a configuration of an aerial image display device and display of an aerial image according to a sixth embodiment of the present invention.

In the aerial image display devices 100 according to the fourth and fifth embodiments, the number of optical elements 130 is one. However, the number of optical elements 130 may be two or more. Since the optical element 140 is used in combination with the optical element 130 in the aerial image display device 100, the number of optical elements 140 is also two or more. FIG. 17 is a side view illustrating a configuration example of an aerial image display device 100 according to a sixth embodiment including a plurality of optical elements 130 and a plurality of optical elements 140. In FIG. 17, the same elements as those in FIGS. 15 and 16 are denoted by the same reference numerals. Detailed description of these elements will be omitted for avoiding redundant description.

As illustrated in FIG. 17, the aerial image display device 100 according to the present embodiment includes a plurality of optical elements 130 (optical elements 130-1 and 130-2) and optical elements 140 (optical elements 140-1 and 140-2). In the present embodiment, each of the optical elements 140 is installed at a position away from the top surface of the housing 100a (the display surface of the display device 110) by D in the Y direction.

The optical elements 130-1 and 130-2 are sequentially arranged along the observation direction of the observer 1. In FIG. 17, when viewed from the observer 1, the optical element 130-2 is installed on the front side, and the optical element 130-1 is installed on the back side. In the present embodiment, the display surface of the display device 110 extends from a front side end portion of the optical element 130-2 to a back side end portion of the optical element 120. The display device 110 causes display images to be individually displayed in different display regions of the display surface corresponding to the optical elements 120, 130-1, and 130-2. The optical element 130-2 is installed substantially parallel to the optical element 130-1. The optical elements 130-1 and 130-2 correspond to a plurality of first optical elements of the present invention.

The optical elements 140-1 and 140-2 are sequentially arranged along the observation direction of the observer 1. In FIG. 17, when viewed from the observer 1, the optical element 140-2 is installed on the front side, and the optical element 140-1 is installed on the back side. In the present embodiment, the display surface of the display device 111 extends from a front side end portion of the optical element 140-2 to a back side end portion of the optical element 140-1. The display device 111 causes display images to be individually displayed in different display regions of the display surface corresponding to the optical elements 140-1 and 140-2. The optical elements 140-1 and 140-2 correspond to a plurality of second optical elements of the present invention. The optical elements 140-1 and 140-2 are installed substantially in parallel with the display device 110 and the display device 111.

The optical element 130-1 transmits the emitted light from the display region of the display device 110 corresponding to the optical element 130-1 (corresponding to one of a plurality of first display regions of the present invention) and reflects reflected light obtained by reflecting the transmitted light by the optical element 140-1 toward the observer 1. Further, the optical element 130-1 reflects the emitted light from the display region of the display device 111 (corresponding to one of a plurality of second display regions of the present invention) corresponding to the optical element 140-1 that has passed through the optical element 140-1 toward the observer 1. Further, the optical element 130-1 transmits the light reflected toward the observer 1 by the optical element 120.

The optical element 130-2 transmits the emitted light from the display region of the display device 110 corresponding to the optical element 130-2 (corresponding to one of a plurality of first display regions of the present invention) and reflects the reflected light obtained by reflecting the transmitted light by the optical element 140-2 toward the observer 1. Further, the optical element 130-2 reflects the light which has been emitted from the display region of the display device 111 corresponding to the optical element 140-2 (corresponding to one of a plurality of second display regions of the present invention) and has passed through the optical element 140-2 toward the observer 1. Further, the optical element 130-2 transmits the light reflected toward the observer 1 by the optical element 120 and the optical element 130-1.

As illustrated in FIG. 17, the display device 110 causes display images A1, A2, and A3 to be displayed in different display regions of the display surface corresponding to the optical elements 120, 130-1, and 130-2. Further, the display device 111 causes display images A0 and A4 to be displayed in different display regions of the display surface corresponding to the optical elements 140-1 and 140-2. For example, a virtual image B3 of the display image A3 is formed at a position away from the back side end portion of the optical element 130-2 by D in the X direction. In other words, the virtual image B3 is formed at a position corresponding to the distance between the display device 110 and the optical element 140-2 in the observation direction of the observer 1 from the optical element 130-2. Further, for example, a virtual image B4 of the display image A4 is formed at a position away from the back side end portion of the optical element 130-2 by d1 in the X direction. In other words, the virtual image B4 is formed at a position corresponding to the distance between the display device 111 and the optical element 140-2 along the observation direction of the observer 1 from the optical element 130-2. The aerial image display device 100 according to the present embodiment can cause the virtual image B1 of the display image A1, the virtual image B2 of the display image A2 (fifth display images), the virtual image B0 of the display image A0 (sixth display images), the virtual image B3 of the display image A3, and the virtual image B4 of the display image A4 to be superimposedly displayed on the back side when viewed from the observer 1 without interfering each other. Here, in the example of FIG. 17, the distance (d1) between the display device 111 and the optical element 140 is smaller than the height D of the housing 100a.

As described above, in the aerial image display device 100 according to the present embodiment, the number of virtual images which can be superimposedly displayed can be further increased by setting the number of optical elements 130 to two or more. Therefore, in addition to the effects of the fourth embodiment, the aerial image display device 100 according to the present embodiment has an effect in that it is possible to adjust the number of virtual images easily without changing the basic configuration.

Seventh Embodiment

In the fourth to sixth embodiments, the display surface of the display device 110 is used to display the display image even when it is divided into a plurality of display regions. In the seventh embodiment, a part of the display region of the display surface of the display device 110 is used for purposes other than the display of the display image.

Figure 18:
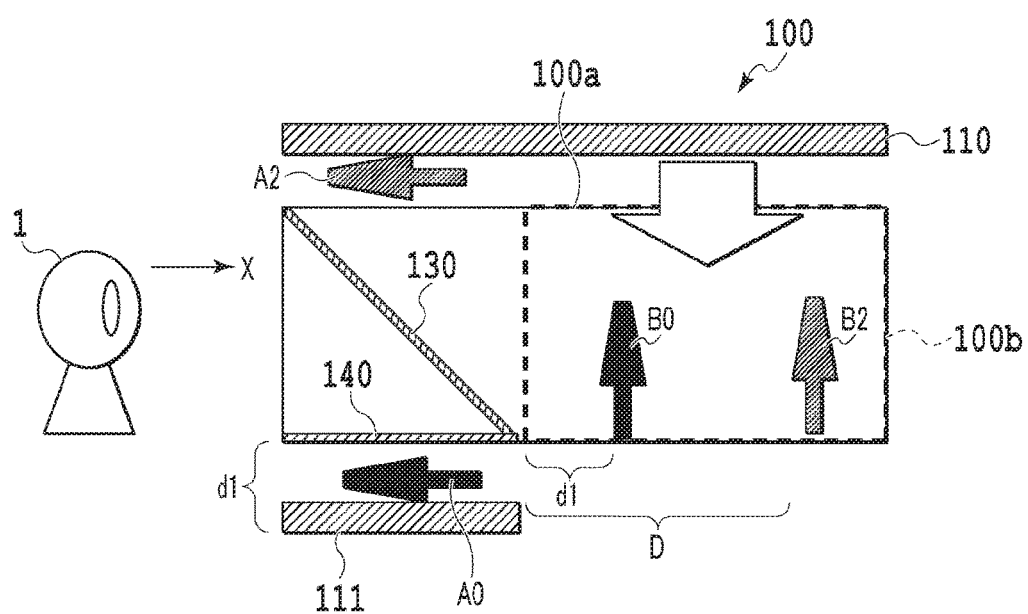
FIG. 18 is a diagram for describing a configuration of an aerial image display device and display of an aerial image according to a seventh embodiment of the present invention.

FIG. 18 is a side view illustrating a configuration example of an aerial image display device 100 according to the present embodiment. In FIG. 18, the same elements as those in FIGS. 15 to 17 are denoted by the same reference numerals. Detailed description of these elements will be omitted for avoiding redundant description.

The aerial image display device 100 of FIG. 18 differs from the aerial image display device 100 according to the fifth embodiment illustrated in FIG. 16 in that the optical element 120 is not installed.

Further, in the present embodiment, a display image A2 is displayed in the display region of the display device 110 corresponding to the optical element 130. A virtual image B2 of the display image A2 is formed at a position away from the back side end portion of the optical element 130 by D in the X direction. Further, a display image A0 is displayed in the display region of the display device 111 corresponding to the optical element 140. A virtual image B0 of the display image A0 is formed at a position away from the back side end portion of the optical element 130 by d1 in the X direction.

Figure 19:
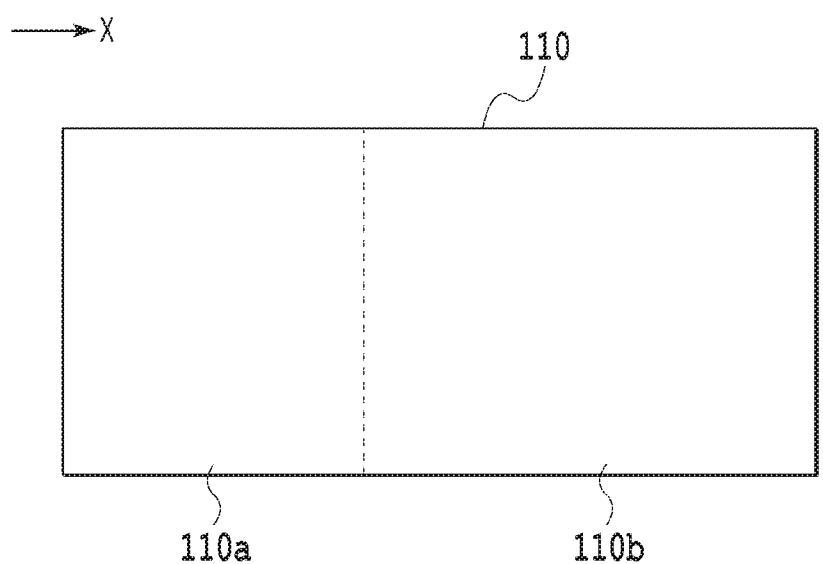
FIG. 19 is a top view of a display surface of the display device illustrated in FIG. 18.

Here, in the present embodiment, the display surface of the display device 110 is divided into two regions, that is, an aerial image generation region 110a and an illumination control region 110b as illustrated in FIG. 19.

The aerial image generation region 110a is a region in which the display device 110 displays the display image A2 corresponding to the virtual image B2.

The illumination control region 110b is a region which is different from the aerial image generation region 110a in the display surface of the display device 110 and corresponds to a real space 100b in which the virtual image B0 and the virtual image B2 are formed. The real space 100b is a space on the back side further than the back side end portion of the optical element 130 in the housing 100a when viewed from the observer 1. In other words, as illustrated in FIG. 19, the illumination control region 110b is formed on the back side further than the aerial image generation region 110a when viewed from the observer 1 (in the X direction). In the illumination control region 110b, display for illuminating the real space 100b (shining the inside of the real space 100b) is performed. The real space 100b corresponds to a region, in which the virtual image is formed, of the present invention.

For example, it is possible to display the aerial image with the more realistic sensation by forming the virtual image B0 and the virtual image B2 indicating fish images and performing display in the illumination control region 110b so that an illumination effect of expressing wave fluctuation is obtained in the real space 100b. Further, for example, it is possible to display the aerial image with the more realistic sensation by forming the virtual image B0 and the virtual image B2 indicating flame images and performing display in the illumination control region 110b so that an illumination effect of expressing light illuminated by the flame is obtained in the real space 100b.

As described above, in the present embodiment, the virtual image B0 and the virtual image B2 are formed at positions away from the back side end portion of the optical element 130 when viewed from the observer 1. Since the virtual image B0 and the virtual image B2 are formed at the positions away from the optical element 130, it is possible to illuminate the real space in which the virtual image B0 and the virtual image B2 are formed, and it is possible to display the aerial image with the more realistic sensation.

Figure 20:
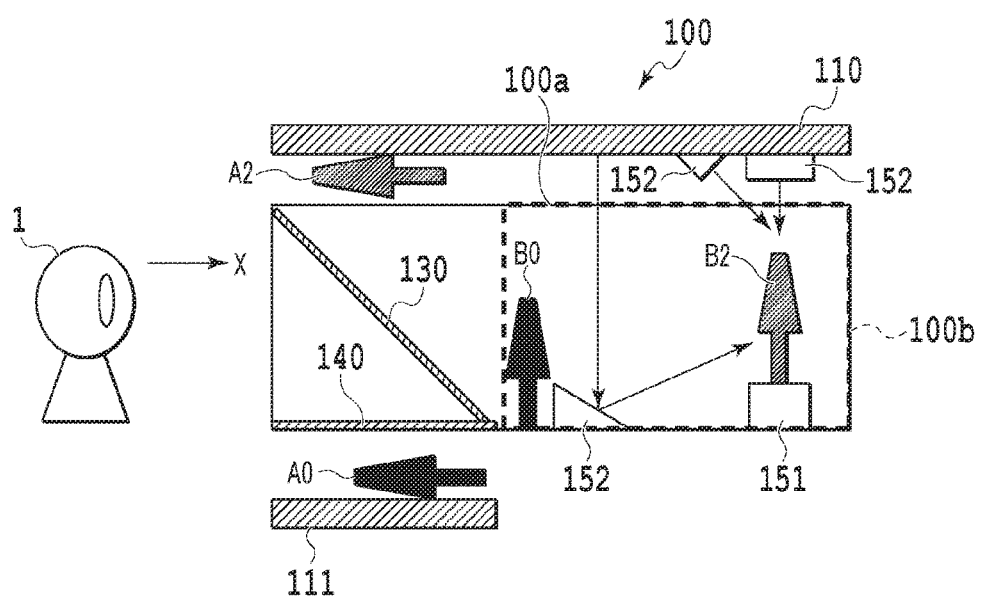
FIG. 20 is a diagram illustrating another configuration example of the aerial image display device according to the seventh embodiment of the present invention.

Further, as illustrated in FIG. 20, a real object 151 such as a figure or a relief may be placed in the real space 100b and visually recognized by the observer 1 together with the virtual image B2.

Further, as illustrated in FIG. 20, an optical element 152 such as a lens, a light guide plate, a prism, or a mirror for diffusing or converging light from the illumination control region 110b may be placed in the real space 100b in a range in which light from the illumination control region 110b reaches. By arranging such an optical element 152, it is possible to further enhance the illumination effect.

As described above, the aerial image display device 100 according to the present embodiment can illuminate the real space 100b in which the virtual image is formed. Therefore, in addition to the effects of the fourth embodiment, the aerial image display device 100 according to the present embodiment has the effect in that it is possible to cause the aerial image with the more realistic sensation to be visually recognized by the observer 1.

The present invention has been described with reference to the appended drawings and the embodiments, but it should be noted that those skilled in the art can easily make various variations or modifications on the basis of the present disclosure. Therefore, it should be noted that these variations or modifications are included within the scope of the present invention.

For example, in the sixth embodiment, each optical element 140 is installed at a position away from the top surface of the housing 100a by D in the Y direction. It may be possible to set the distance between each optical element 140 and the top surface of the housing 100a individually. At this time, it is possible to individually adjust the positions at which the virtual images B2 and B3 are formed. Accordingly, it is possible to further change an arrangement order of the virtual images to be superimposed. Further, it is possible to display the aerial image with the more stereoscopic effect by reducing the distance between the virtual images.

For example, in the seventh embodiment, the illumination control region 110b is formed in a part of the display surface of the display device 110, and the real space 100b is illuminated by the display of the illumination control region 110b. However, the present invention is not limited to this example, and a configuration for illuminating the real space 100b may be installed separately from the display device 110. An illumination control region may be formed in a part of the display surface of the display device 111.

For example, in the seventh embodiment, the display surface of the display device 110 is divided into two regions. However, the present invention is not limited to this example, and two display devices may be prepared instead of the display device 110, the display surface of one display device may be used as the aerial image generation region 110a, and the display surface of the other display device may be used as the illumination control region 110b.

Further, in the seventh embodiment, the two optical elements are used, but the number of virtual images may be increased by further increasing the number of optical elements.

Eighth Embodiment

The aerial image display devices 100 according to the first to seventh embodiment are configured so that the observer observes the same virtual image with both eyes. However, it is possible to generate a more stereoscopic virtual image by displaying a right eye virtual image and a left eye virtual image with an appropriate parallax.

Figure 21A:
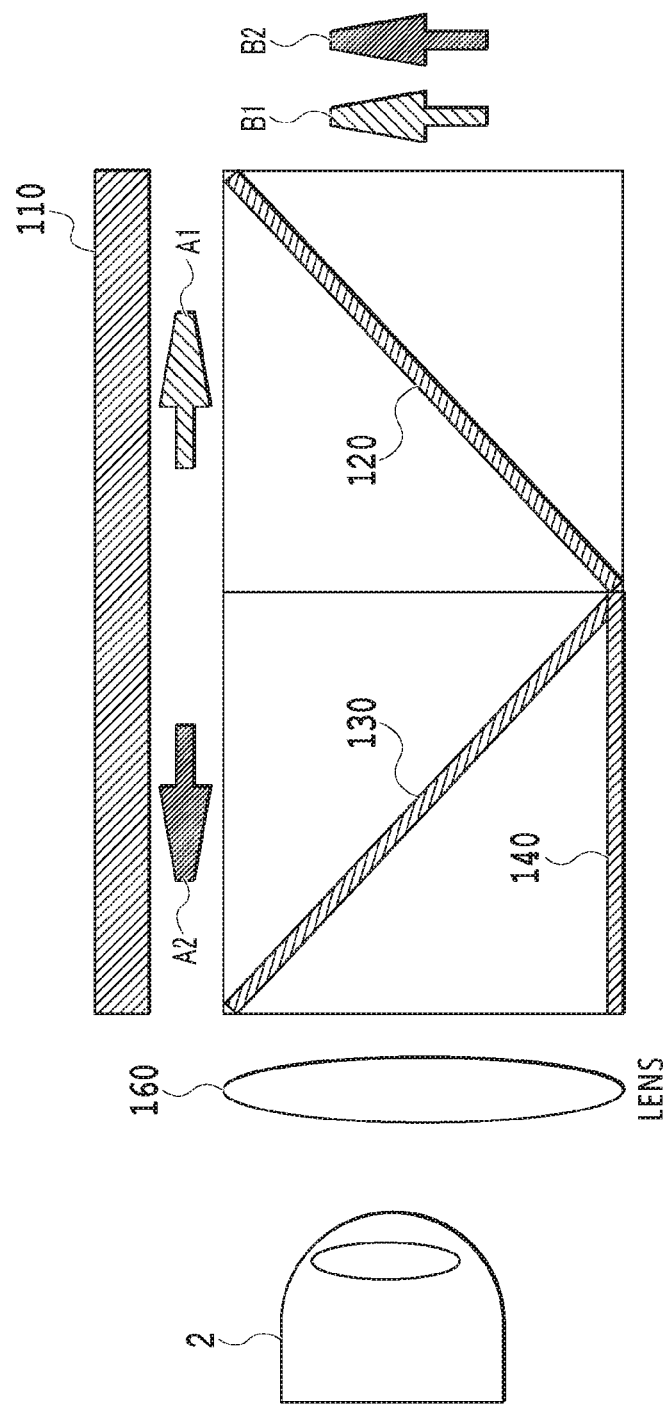
FIG. 21A is a side view illustrating a configuration example of an aerial image display device according to an eighth embodiment of the present invention.
Figure 21B:
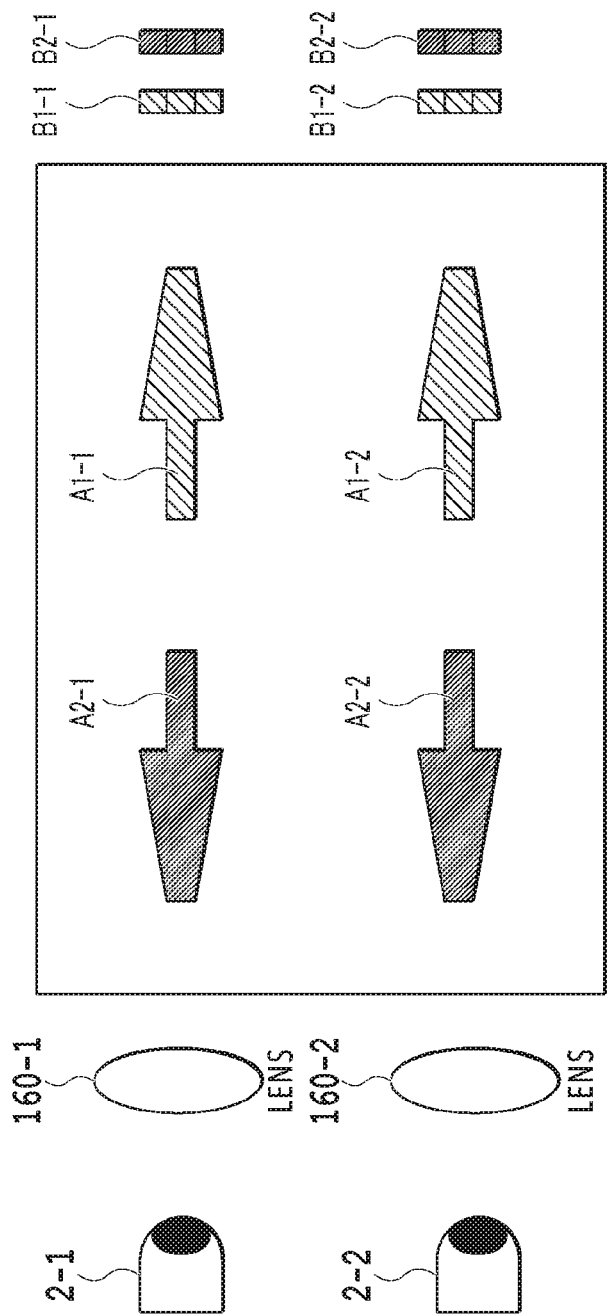
FIG. 21B is a top view illustrating a configuration example of the aerial image display device according to the eighth embodiment of the present invention.

FIG. 21A is a side view illustrating a configuration example of an aerial image display device 100 according to an eighth embodiment of the present invention, and FIG. 21B is a top view simplified for describing the display device 110. The aerial image display device 100 illustrated in FIGS. 21A and 21B differs from that of the first embodiment in that lenses 160-1 and 160-2 are installed, and right eye display images A1-1 and A2-1 and left eye display images A2-1 and A2-2 are displayed in the display device 110. On the other hand, the display device 110, the optical elements 120 and 130, and the reflecting member 140 have the same structure as in the first embodiment and are shared by the right eye and the left eye.

Since the lenses 160-1 and 160-2 are installed, one eye 2-1 can observe only the virtual images B1-1 and B2-1 through the lens 160-1, and the other eye 2-2 can observe only the virtual images B1-2 and B2-2 through the lens 160-2.

As described above, in the present embodiment, the observer can observe the virtual images with the appropriate parallax between the right eye and the left eye and visually recognize a more stereoscopic aerial image through a binocular parallax stereoscopic view.

In the present embodiment, the display device 110, the optical elements 120 and 130, and the reflecting member 140 are shared by the right eye and the left eye, but the display device, the optical element, and the reflecting member may be separately prepared for each of the right eye and the left eye.

Instead of the lenses 160-1 and 160-2, a partition plate may be installed between the display region of the display images A1-1 and A2-1 and the display region of the display images A2-1 and A2-2.

In the first to eighth embodiments, the specific configurations have been described, but the present invention is not limited to the configurations described in the first to eighth embodiments, and it should be noted that a configuration in which the configurations are combined or a configuration in which the number of optical elements is increased to further increase the number of virtual images having different depths is also included.

REFERENCE SIGNS LIST

1: observer
2, 2-1, 2-2: eye of observer
10, 100, 100A, 100B, 100C: aerial image display device
100a: housing
100b: real space
110, 111: display device
110a: aerial image generation region
110b: illumination control region
120, 130, 130-1, 130-2, 140, 140-1, 140-2, 120a, 120b, 130f, 130m: optical element
140, 140-1, 140-2, 140a, 140f and 140m: reflecting member
141, 142: mirror
143: micro mirror
151: real object
152: optical element
160, 160-1, 160-2: lens
171, 172: display

The invention claimed is:

1. An aerial image display device, comprising:
a display device;
a first optical element on which light emitted from the display device is incident, the first optical element transmitting part of incident light and reflecting part of the incident light;
a second optical element on which the light emitted from the display device is incident, the second optical element reflecting the light which is emitted from the display device and passes through the first optical element toward a reflecting surface of the first optical element, and
a third optical element on which the light emitted from the display device is incident, the third optical element reflecting the light emitted from the display device toward a transmitting surface of the first optical element,
wherein the light which is emitted from the display device, reflected by the second optical element, and reflected by the reflecting surface of the first optical element forms a first virtual image corresponding to a first display image displayed on the display device,
wherein the light which is emitted from the display device and reflected by the third optical element forms a second virtual image corresponding to a second display image displayed on the display device, and
the second optical element is installed so that an optical path length until the light emitted from the display device is reflected is larger than an optical path length until the third optical element reflects the light emitted from the display device.

2. The aerial image display device according to claim 1, further comprising:
one or more fourth optical elements on which the light emitted from the display device is incident, the one or more fourth optical elements being arranged between the first optical element and the third optical element, transmitting part of the incident light, and reflecting part of the incidence light; and
one or more fifth optical elements on which the light emitted from the display device is incident, the one or more fifth optical elements reflecting the light which is emitted from the display device and passes through the one or more fourth optical elements toward reflecting surfaces of the one or more fourth optical elements,
wherein the light which is emitted from the display device, reflected by the one or more fifth optical elements, and reflected toward the transmitting surface of the first optical element by the reflecting surfaces of the one or more fourth optical elements forms one or more third virtual images corresponding to one or more third display images displayed on the display device, and
the second optical element and the one or more fifth optical elements are installed so that the first optical element, the one or more fourth optical elements, and the third optical element are in a descending order of optical path lengths until the light emitted from the display device is reflected.

3. The aerial image display device according to claim 2, wherein the first and second display images and the one or more third display images are in a descending order of sizes in accordance with an arrangement order of a corresponding optical element from the first display image.

4. The aerial image display device according to claim 2, wherein the first optical element, the one or more fourth optical elements, the third optical element are in a descending order of heights of positions of upper ends thereof in accordance with an arrangement order from the first optical element.

5. The aerial image display device according to claim 2, wherein the third optical element has higher reflectance than the first optical element and the one or more fourth optical elements, and the second optical element is installed so that when an observer views the first and second virtual images from the first optical element side, the first virtual image is formed on the back side further than the second virtual image.

6. The aerial image display device according to claim 1, wherein the third optical element has higher reflectance than the first optical element and the one or more second optical elements, and
the second optical element is installed so that when an observer views the first and second virtual images from the first optical element side, the first virtual image is formed on the back side further than the second virtual image.

7. The aerial image display device according to claim 1, wherein the second optical element includes a plurality of optical elements, and reflects the light passing through the first optical element multiple times through the plurality of optical elements and emits the reflected light to the first optical element.

8. The aerial image display device according to claim 1, wherein an angle formed by the first optical element and the second optical element is about 45°, and an angle formed by the first optical element and the display surface of the display device is greater than 0° and less than 90°.

9. The aerial image display device according to claim 1, wherein the second optical element is installed substantially parallel to the display surface of the display device, an angle formed by the second optical element and the first optical element deviates from 45° by a predetermined angle, and an angle formed by the first optical element and the display surface is greater than 0° and less than 90°, and
the display image of the display surface is corrected in accordance with the predetermined angle.

10. The aerial image display device according to claim 1, further comprising:
a first lens that forms a first portion of the first virtual image; and
a second lens that forms a second portion of the first virtual image.

11. An aerial image display device, comprising:
a display device;
a first optical element on which light emitted from the display device is incident, the first optical element transmitting part of incident light and reflecting part of the incident light; and
a second optical element on which the light emitted from the display device is incident, the second optical element reflecting the light which is emitted from the display device and passes through the first optical element toward a reflecting surface of the first optical element,
wherein the light which is emitted from the display device, reflected by the second optical element, and reflected by the reflecting surface of the first optical element forms a first virtual image corresponding to a first display image displayed on the display device,
wherein the display device includes a first display device and a second display device installed to face the first display device with the first and second optical elements interposed therebetween,
the second optical element includes a reflecting surface that reflects the light which is emitted from the first display device and passes through the first optical element toward the reflecting surface of the first optical element and a transmitting surface that transmits the light emitted from the second display device and faces the reflecting surface of the second optical element,
the light emitted from the first display device passes through the transmitting surface of the first optical element and is incident on the reflecting surface of the second optical element,
the light emitted from the second display device passes through the transmitting surface of the second optical element and is incident on the reflecting surface of the first optical element, and
the light which is emitted from the first display device, reflected by the second optical element, and reflected by the reflecting surface of the first optical element forms a second virtual image corresponding to a second display image displayed on the first display device, and the light which is emitted from the second display device, passes through the second optical element, and is reflected by the reflecting surface of the first optical element forms a third virtual image corresponding to a third display image displayed on the second display device.

12. The aerial image display device according to claim 11, wherein the first display device, the second display device, and the second optical element are installed substantially parallel to one another, and
the first optical element is arranged to form an angle of about 45° with the second optical element.

13. The aerial image display device according to claim 11, further comprising,
a third optical element on which the light emitted from the first display device is incident, the third optical element reflecting the light emitted from the first display device toward the transmitting surface of the first optical element,
wherein the light which is emitted from the first display device and reflected by the third optical element forms a fourth virtual image corresponding to a fourth display image displayed on the first display device.

14. The aerial image display device according to claim 13, further comprising:
one or more fourth optical elements on which the light emitted from the first and second display devices is incident, the one or more fourth optical elements being arranged between the first optical element and the third optical element, transmitting part of the incident light from the first display device, and reflecting part of the incidence light; and
one or more fifth optical elements on which the light emitted from the first and second display devices is incident, each of the one or more fifth optical elements including a reflecting surface that reflects the light which is emitted from the first display device and passes through the one or more fourth optical elements toward the reflecting surfaces of the one or more fourth optical elements and a transmitting surface that transmits the light emitted from the second display device and faces the reflecting surfaces of the one or more fifth optical elements,
wherein the light which is emitted from the first display device, reflected by the one or more fifth optical elements, and reflected by the reflecting surfaces of the one or more fourth optical elements forms one or more fifth virtual images corresponding to one or more fifth display images displayed on the first display device, and the light which is emitted from the second display device, passes through the one or more fifth optical elements, and reflected on the reflecting surfaces of the one or more fourth optical elements forms one or more sixth virtual images corresponding to one or more sixth display images displayed on the second display device.

15. The aerial image display device according to claim 11, wherein a region in which the second to fourth virtual images, the one or more fifth virtual images, and the one or more sixth virtual images are formed is illuminated by the first display device.

* * * * *